US008537151B2

(12) United States Patent
Tajika et al.

(10) Patent No.: US 8,537,151 B2
(45) Date of Patent: Sep. 17, 2013

(54) INSPECTION METHOD

(75) Inventors: Kenichi Tajika, Osaka (JP); Hiroshi Shirouzu, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/462,296

(22) Filed: May 2, 2012

(65) Prior Publication Data

US 2012/0212475 A1 Aug. 23, 2012

Related U.S. Application Data

(63) Continuation of application No. PCT/JP2010/006371, filed on Oct. 28, 2010.

(51) Int. Cl.

| | |
|---|---|
| ***G06F 3/038*** | (2013.01) |
| ***G09G 5/00*** | (2006.01) |
| ***G09G 3/30*** | (2006.01) |
| ***G09G 3/10*** | (2006.01) |
| ***G02F 1/1333*** | (2006.01) |

(52) U.S. Cl.
USPC ............. 345/212; 345/80; 315/169.3; 349/56

(58) Field of Classification Search
USPC ............................................. 345/212
See application file for complete search history.

(56) References Cited

U.S. PATENT DOCUMENTS

| | | | | |
|---|---|---|---|---|
| 6,064,362 | A | 5/2000 | Brownlow et al. | |
| 6,815,975 | B2 | 11/2004 | Nara et al. | |
| 2002/0167472 | A1* | 11/2002 | Jinno | 345/76 |
| 2004/0008053 | A1 | 1/2004 | Nara et al. | |
| 2006/0066253 | A1* | 3/2006 | Kim | 315/169.3 |
| 2007/0285595 | A1* | 12/2007 | Hirao | 349/56 |

FOREIGN PATENT DOCUMENTS

| | | | |
|---|---|---|---|
| JP | 05-142573 | | 6/1993 |
| JP | 10-062817 | | 3/1998 |
| JP | 2000-010072 | A | 1/2000 |
| JP | 2001-194646 | A | 7/2001 |
| JP | 2003-337546 | A | 11/2003 |
| JP | 2005-202070 | A | 7/2005 |
| JP | 2008-070702 | A | 3/2008 |
| JP | 2008-175945 | A | 7/2008 |
| JP | 2009-086252 | A | 4/2009 |

* cited by examiner

*Primary Examiner* — Charles V Hicks
(74) *Attorney, Agent, or Firm* — Greenblum & Bernstein, P.L.C.

(57) ABSTRACT

An inspection method for an active-matrix substrate including the scanning lines, the data lines, the pixels disposed in matrix, and the power lines. The pixel includes: an organic EL device; a drive transistor; a capacitor; a selection transistor having a gate connected to the scanning line and connected between the data line and the gate of the drive transistor, and the guard potential transistor having a gate connected to a source of the selection transistor, a source connected to a drain of the selection transistor, and a drain connected to the power line. The inspection method includes: a writing process for writing a charge in the capacitor; a reading process for reading the written charged from the capacitor; and a holding process for holding the charge for a predetermined period from the end of the writing process to the start of the reading process.

16 Claims, 17 Drawing Sheets

| | Open circuit | Short circuit |
|---|---|---|
| Selection transistor 16 ($T_{s1}$) | 0 | Higher than reference value |
| Selection transistor 17 ($T_{s2}$) | 0 | Lower than reference value |
| Guard potential transistor 18 ($T_G$) | Lower than reference value | Higher than reference value |
| Drive transistor 14 ($T_d$) | 0 | Higher than reference value |
| Capacitor 15 (C) | 0 | 0 |

| | Open circuit | Short circuit |
|---|---|---|
| Selection transistor 26 ($T_{s1}$) | 0 | Lower than reference value |
| Selection transistor 27 ($T_{s2}$) | 0 | Lower than reference value |
| Guard potential transistor 28 ($T_G$) | Lower than reference value | Lower than reference value |
| Drive transistor 24 ($T_d$) | — | — |
| Capacitor 25 (C) | 0 | 0 |

FIG. 12

| | Open circuit | Short circuit |
|---|---|---|
| Selection transistor 16 ($T_{s1}$) | 0 | Higher than reference value |
| Selection transistor 17 ($T_{s2}$) | 0 | Lower than reference value |
| Guard potential transistor 18 ($T_G$) | Lower than reference value | Higher than reference value |
| Drive transistor 14 ($T_d$) | 0 | Higher than reference value |
| Capacitor 15 (C) | 0 | 0 |
| Voltage variation reducing transistor 31 ($T_L$) | Higher than reference value | 0 |

FIG. 13

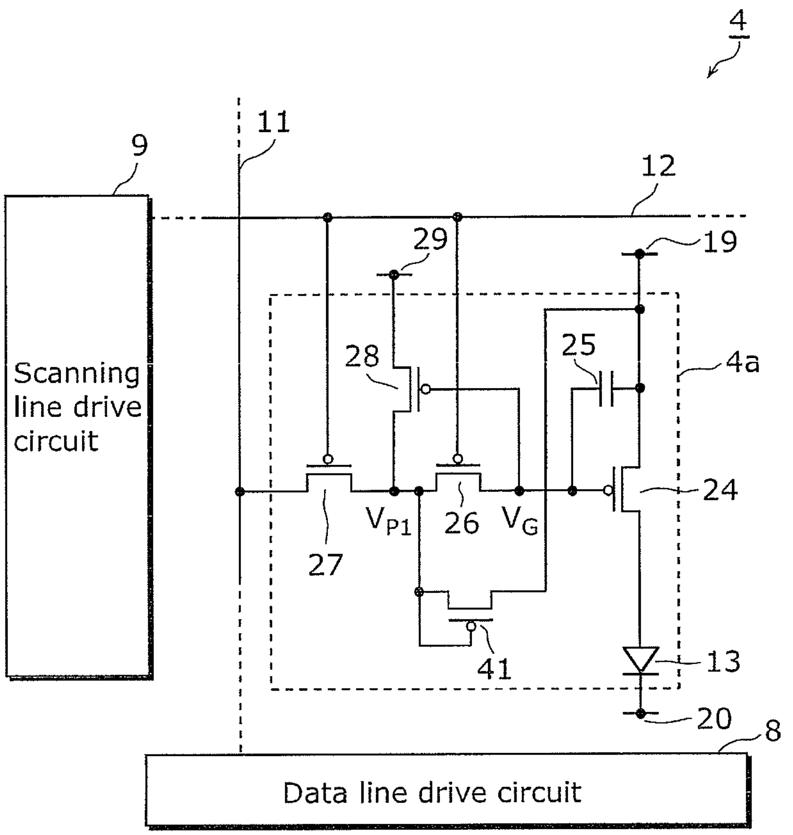

FIG. 15

| | Open circuit | Short circuit |
|---|---|---|
| Selection transistor 26 ($T_{s1}$) | 0 | Lower than reference value |
| Selection transistor 27 ($T_{s2}$) | 0 | Lower than reference value |
| Guard potential transistor 28 ($T_G$) | Lower than reference value | Lower than reference value |
| Drive transistor 24 ($T_d$) | — | — |
| Capacitor 25 (C) | 0 | 0 |
| Voltage variation reducing transistor 41 ($T_L$) | Lower than reference value | Higher than reference value |

FIG. 16

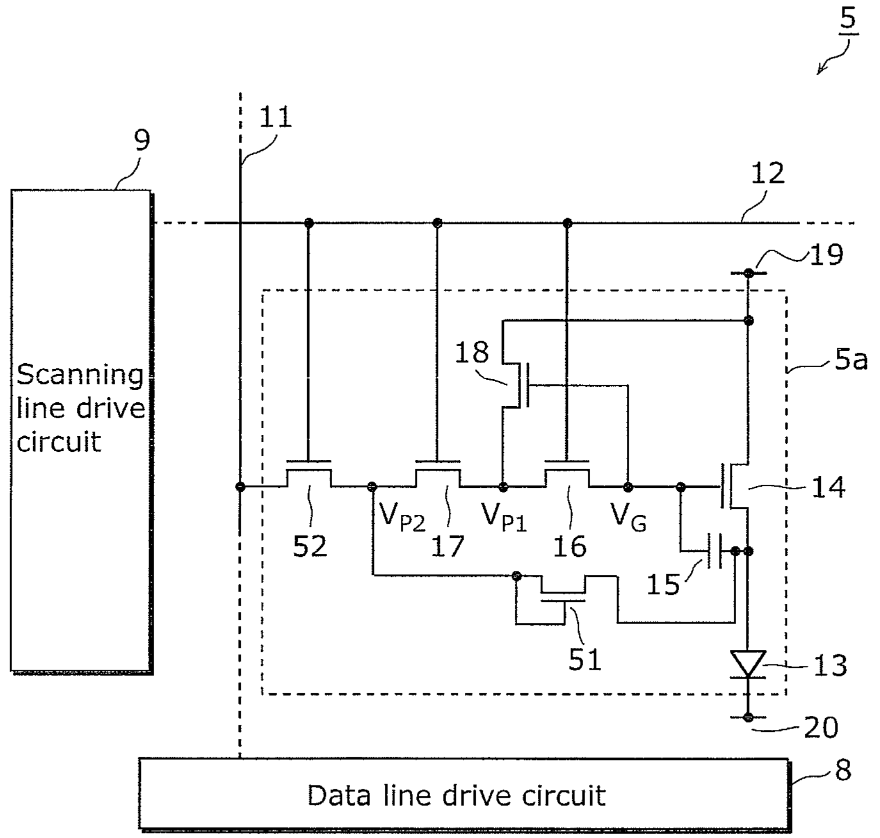

FIG. 18

| | Open circuit | Short circuit |
|---|---|---|
| Selection transistor 52 ($T_{s0}$) | 0 | Lower than reference value |
| Selection transistor 16 ($T_{s1}$) | 0 | Higher than reference value |
| Selection transistor 17 ($T_{s2}$) | 0 | — |
| Guard potential transistor 18 ($T_G$) | Lower than reference value | Higher than reference value |
| Drive transistor 14 ($T_d$) | 0 | Higher than reference value |
| Capacitor 15 (C) | 0 | 0 |
| Voltage variation reducing transistor 51 ($T_L$) | Higher than reference value | 0 |

FIG. 19

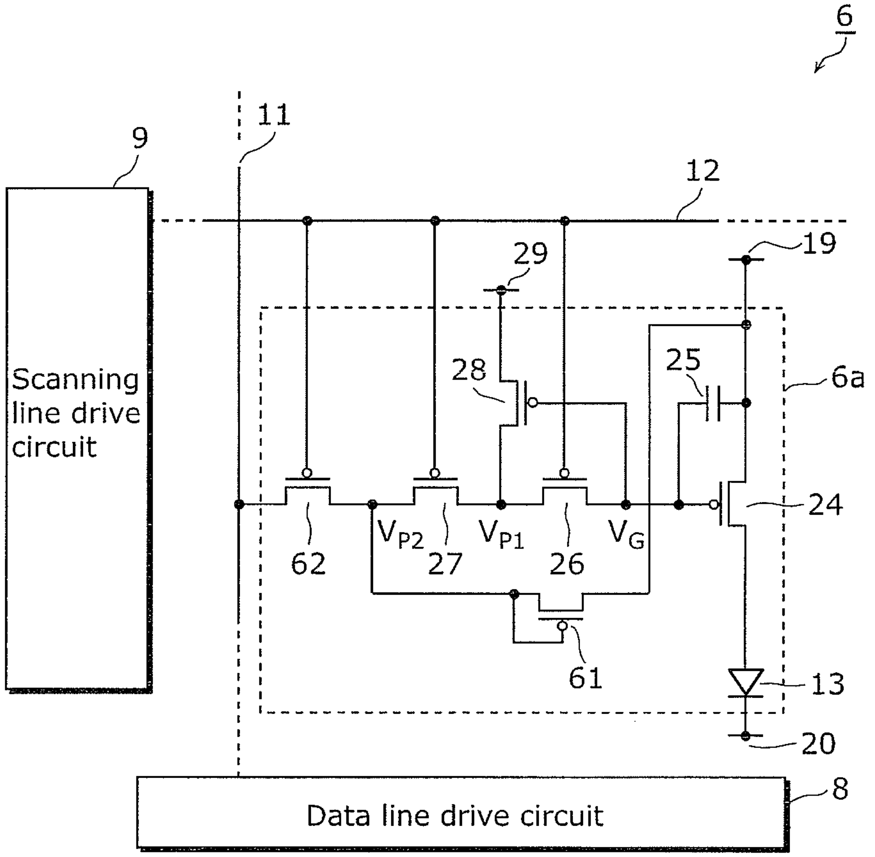

FIG. 21

| | Open circuit | Short circuit |
|---|---|---|
| Selection transistor 62 ($T_{s0}$) | 0 | Lower than reference value |
| Selection transistor 26 ($T_{s1}$) | 0 | Lower than reference value |
| Selection transistor 27 ($T_{s2}$) | 0 | — |
| Guard potential transistor 28 ($T_G$) | Lower than reference value | Lower than reference value |
| Drive transistor 24 ($T_d$) | — | — |
| Capacitor 25 (C) | 0 | 0 |
| Voltage variation reducing transistor 61 ($T_L$) | Lower than reference value | Higher than reference value |

FIG. 22
PRIOR ART

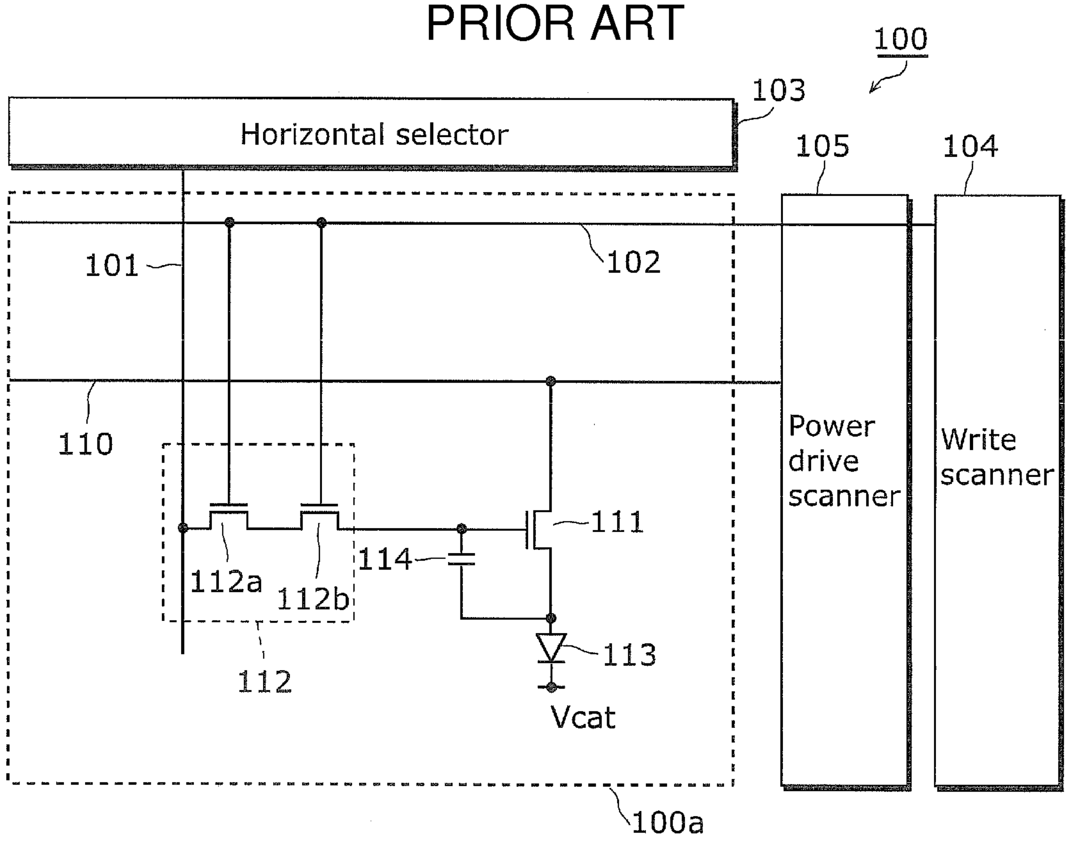

INSPECTION METHOD

CROSS REFERENCE TO RELATED APPLICATIONS

This is a continuation application of PCT Patent Application No. PCT/JP2010/006371 filed on Oct. 28, 2010, designating the United States of America. The entire disclosure of the above-identified application, including the specification, drawings and claims are incorporated herein by reference in its entirety.

TECHNICAL FIELD

Methods consistent with one or more exemplary embodiments of the present disclosure relates to methods of inspecting an active-matrix substrate, and in particular to a method of inspecting an active-matrix substrate using a current-driven light-emitting device.

BACKGROUND ART

A display device using an organic electroluminescence (EL) device is known as an example of a display device using a current-driven light-emitting device. An organic EL display device using such a self-luminous organic EL device does not require a backlight necessary for a liquid-crystal display device and is most suitable when a lower-profile device is desired. Since there is no limit on a viewing angle, organic EL display devices are expected as next-generation display devices to be put to practical use. An organic EL device used in an organic EL display device is different from a liquid-crystal cell which is controlled by a voltage applied to the liquid-crystal cell in that luminance of each light-emitting device is controlled by a value of a current flowing through the light-emitting device.

In an organic EL display device, organic EL devices each constituting a pixel are generally disposed in a matrix. An organic EL display device which has an organic EL device provided at each of intersections of a plurality of row electrodes (scanning lines) and a plurality of column electrodes (data lines) and drives the organic EL devices by applying a voltage corresponding to a data signal between a selected one of the row electrodes and the plurality of column electrodes is referred to as a passive-matrix organic EL display device.

There is another organic EL display device which has a switching thin film transistor (TFT: Thin Film Transistor) provided at each of intersections of a plurality of scanning lines and a plurality of data lines, and a gate of a driver is connected to each switching TFT. A data signal is provided from a signal line to the driver by turning on the switching TFT through a selected one of the scanning lines. An organic EL display device which drives an organic EL device using the driver is referred to as an active-matrix organic EL display device. An active-matrix organic EL display device can cause organic EL devices to emit light until a next scanning (selection) operation, unlike a passive matrix organic EL display device of which organic EL devices connected to respective row electrodes (scanning line) emit light only during a period when the scanning line is selected, and thus even an increase in the number of scanning lines does not invite a reduction in luminance of the display. An active-matrix organic EL display device can thus be driven at a low voltage, which allows a reduction in power consumption.

For example, PTL 1 discloses a circuit configuration of a pixel unit included in an active-matrix organic EL display device.

FIG. 22 is a diagram showing a circuit configuration of a pixel included in a display device described in PTL 1, and a connection with circuits around the pixel. A display device 100 shown in the diagram includes a pixel array unit in which pixels 100*a* are disposed in a matrix, and a drive unit that drives the pixel array unit. In the diagram, only one of the pixels 100*a* included in the pixel array unit is shown for convenience. The pixel array unit includes: scanning lines 102 disposed for respective rows; data lines 101 disposed for respective columns; the pixels 100*a* disposed in rows and columns at the intersections of the scanning lines 102 and the data lines 101; and power supply lines 110 disposed for respective rows. In addition, the drive unit includes a horizontal selector 103, a write scanner 104; and a power drive scanner 105.

The write scanner 104 sequentially supplies control signals to the scanning lines 102 in respective horizontal cycles (1H) and line-sequentially scans the pixels 101, one row at a time. The power drive scanner 105 supplies a variable power voltage to the power supply lines 110 in time with the line-sequentially scanning. The horizontal selector 103 switches between the data voltage which is a video signal and a reference voltage in time with the line-sequentially scanning and supplies the voltage to the columns of the data lines 101. Each of the pixels includes: a drive transistor 111; selection transistors 112*a* and 112*b;* an organic EL device 113; and a capacitor 114. Each of the selection transistors 112*a* and 112*b* is a thin film transistor composing a gate group 112. The drive transistor 111 and the organic EL device 113 are connected in series between the power supply line 110 and a reference potential Vcat (a ground potential, for example,). With this configuration, the cathode of the organic EL device is connected to the reference potential Vcat and the anode is connected to the source of the drive transistor 111, and the drain of the drive transistor 111 is connected to the power supply line 110. In addition, the gate of the drive transistor 111 is connected to a first electrode of the capacitor 114 and one of the source electrode and the drain electrode of the selection transistor 112*b*. Furthermore, a second electrode of the capacitor 114 is connected to the anode of the organic EL device 133.

In addition, one of the source electrode and the drain electrode of the selection transistor 112*a* that forms the gate group 112 is connected to the other of the source electrode and the drain electrode of the selection transistor 112*b*. In addition, the data line 101 is connected to the other of the source electrode and the drain electrode of the selection transistor 112*a*. The gates of the selection transistors 112*a* and 112*b* are connected to the scanning line 102.

In the above-described configuration, the power drive scanner 105 switches the power supply line 110 from the first voltage (high voltage) to the second voltage (low voltage) with the data line 101 being at a threshold detecting voltage. Likewise, the write scanner 104 raises the voltage of the scanning line 102 to a high level with the data line 101 being at the threshold detecting voltage to bring the selection transistors 112*a* and 112*b* into conduction, and apply the threshold detecting voltage to the gate of the drive transistor 111. Next, the power drive scanner 105 switches the voltage of the power supply line 110 from the second voltage to the first voltage to cause the capacitor 114 to hold the voltage corresponding to the threshold voltage of the drive transistor 111, in a correction period before the voltage of the data line 101 switches from the threshold detecting voltage to the data voltage. Next, the write scanner 104 changes the voltages of the selection transistors 112*a* and 112*b* to a high level and causes the capacitor 114 to hold the data voltage. That is, the data voltage is added to the voltage corresponding to the threshold voltage of the drive transistor 111 held previously, and written in the capacitor 114. Then, the drive transistor 111 is supplied with a current by the power supply line 110 at the first voltage and causes a drive current corresponding to the voltage that is held to flow in the organic EL device 113.

As described above, the write scanner 104 turns the gate group 112 on and off, thereby writing and holding the data voltage. The configuration in which two selection transistors are connected in series, as in the gate group 112, is referred to as a double-gate configuration. The double-gate configuration contributes to doubling the off resistance of the gate group 112. Furthermore, even when one of the selection transistors causes off-leakage, the other selection transistor curbs the off-leakage, reducing the off-leakage current approximately by half.

PTL 1 states that the above-described double-gate configuration allows accurately writing luminance information into a pixel and providing a display device with a high image quality without causing variation in the luminance of the organic EL device 113.

In addition, there is a known method of determining whether or not any of the selection transistors 112*a* and 112*b* included in the gate group 112 and the capacitor 114 is faulty, that is, a method of determining pass or fail of the pixel 100*a*. As shown in FIG. 23, a charge is written in each of the pixels 100*a*, and the charge is sequentially read from each of the pixels 100*a* upon completing the writing. Then the written value and the read value are compared, thereby determining the pass or fail of the pixel 100*a*.

More specifically, when the written value and the read value are identical, it is found that none of the selection transistors 112*a* and 112*b* and the capacitor 114 is faulty, in other words, the pixel 100*a* is acceptable. Furthermore, when the written value and the read value are different from each another, it is found that any of the selection transistors 112*a* and 112*b* and the capacitor 114 is faulty, in other words, the pixel 100*a* is unacceptable.

CITATION LIST

Patent Literature

[PTL 1] Japanese Unexamined Patent Application Publication No. 2008-175945

SUMMARY OF INVENTION

Technical Problem

However, the conventional technique described above poses the problem described below.

With the display device described in PTL 1, although the gate group 112 composed of the thin film transistors connected in series can reduce the off-leakage current by half, it is difficult to completely turn off the gate group 112. This poses a problem that, during the holding operation of a data voltage performed by the capacitor 114, a charge that is held leaks to the data line 101, resulting in a change in a drive current during a display period.

In order to solve this problem, conventionally, a large capacitance is set to the capacitor in advance in view of the off-leakage current, for curbing the effect. However, with the miniaturization of the pixels accompanying the increase in the definition of the display screen, it is difficult to ensure the size of the capacitor that occupies most of the pixel circuit.

In view of the above, a display device is desired which includes a pixel in which a time-dependent change in a voltage held therein is not caused by an off-leakage current, even with the progress in miniaturization of the pixel. Adding a new transistor, for example, is considered for implementing such a display device. With the conventional methods, however, a leakage through the newly added transistor cannot be detected, and thus the pass or fail of the pixel cannot be correctly determined.

In order to solve the above-described conventional problems, one or more exemplary embodiments are conceived and an inspection method is provided which enables correctly determining pass or fail of a pixel, in an active-matrix substrate including the pixel in which a time-dependent change in a voltage held therein is not caused by an off-leakage current, even with the progress in miniaturization of the pixel.

Solution to Problem

In order to solve the above-stated problems, an inspection method according to an aspect of the present disclosure is an inspection method for an active-matrix substrate including a plurality of scanning lines, a plurality of data lines, a plurality of pixels each disposed at an intersection of one of the scanning lines and one of the data lines, and a power line for supplying current to the pixels, in which each of the pixels includes: a light-emitting device which emits light according to a flow of a drive current corresponding to a data voltage supplied through one of the data lines; a drive transistor which is connected between the power line and the light-emitting device and which converts the data voltage into the drive current, according to a voltage applied to a gate electrode of the drive transistor; a capacitor which has one electrode connected to the gate electrode of the drive transistor and which holds a voltage corresponding to the data voltage; a first transistor having (i) a gate electrode connected to one of the scanning lines and (ii) one of a source electrode and a drain electrode connected to the gate electrode of the drive transistor; a second transistor having (i) a gate electrode connected to the scanning line, (ii) one of a source electrode and a drain electrode connected to the other of the source electrode and the drain electrode of the first transistor, and (iii) the other of the source electrode and the drain electrode connected to the data line; a third transistor having (i) a gate electrode connected to the one of the source electrode and the drain electrode of the first transistor, (ii) a source electrode connected to the other of the source electrode and the drain electrode of the first transistor, and (iii) a drain electrode connected to a first potential line; and a fourth transistor having a gate electrode connected to a drain electrode that is connected to the other of the source electrode and the drain electrode of the first transistor, and a source electrode connected to a second potential line, the inspection method including: writing a charge in the capacitor; reading the written charge from the capacitor; and holding the charge for a predetermined period from an end of the writing to a start of the reading.

Advantageous Effects of Invention

According to the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel.

BRIEF DESCRIPTION OF DRAWINGS

These and other advantages and features of the present disclosure will become apparent from the following description thereof taken in conjunction with the accompanying Drawings that illustrate general and specific exemplary embodiments of the present disclosure.

In the Drawings:

FIG. 12 is a diagram illustrating an example of the relationship between the pass or fail of each of the elements and a charge that is read in the inspection method according to Embodiment 2 of the present disclosure;

FIG. 13 is a diagram illustrating an example of a circuit configuration of a pixel and connections with circuits around the pixel included in a display device according to a modification of Embodiment 2 of the present disclosure;

FIG. 15 is a diagram illustrating an example of the relationship between the pass or fail of each of the elements and a charge that is read in the inspection method according to the modification of Embodiment 2 of the present disclosure;

FIG. 16 is a diagram illustrating an example of a circuit configuration of a pixel and connections with circuits around the pixel included in a display device according to Embodiment 3 of the present disclosure;

FIG. 18 is a diagram illustrating an example of the relationship between the pass or fail of each of the elements and a charge that is read in the inspection method according to Embodiment 3 of the present disclosure;

FIG. 19 is a diagram illustrating an example of a circuit configuration of a pixel and connections with circuits around the pixel included in a display device according to a modification of Embodiment 3 of the present disclosure;

FIG. 21 is a diagram illustrating an example of the relationship between the pass or fail of each of the elements and a charge that is read in the inspection method according to the modification of Embodiment 3 of the present disclosure;

FIG. 22 is a diagram illustrating a circuit configuration of a pixel and connections with circuits around the pixel included in a conventional display device.

DESCRIPTION OF EMBODIMENTS

Figure 1:
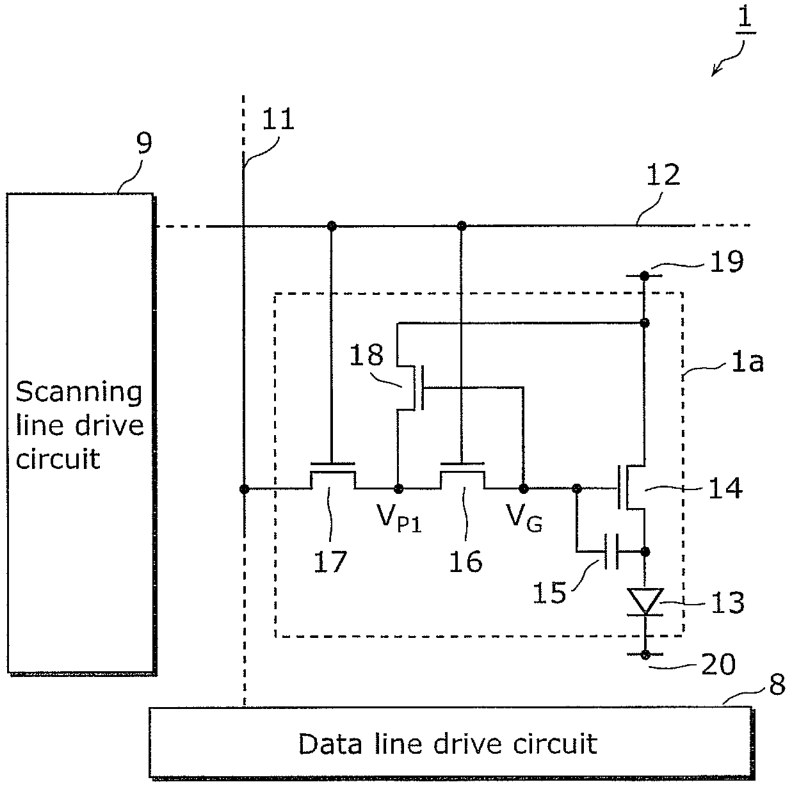
FIG. 1 is a diagram illustrating an example of a circuit configuration of a pixel and connections with circuits around the pixel included in a display device according to Embodiment 1 of the present disclosure.

According to an exemplary embodiment of the present disclosure, an inspection method for an active-matrix substrate including a plurality of scanning lines, a plurality of data lines, a plurality of pixels each disposed at an intersection of one of the scanning lines and one of the data lines, and a power line for supplying current to the pixels, in which each of the pixels includes: a light-emitting device which emits light according to a flow of a drive current corresponding to a data voltage supplied through one of the data lines; a drive transistor which is connected between the power line and the light-emitting device and which converts the data voltage into the drive current, according to a voltage applied to a gate electrode of the drive transistor; a capacitor which has one electrode connected to the gate electrode of the drive transistor and which holds a voltage corresponding to the data voltage; a first transistor having (i) a gate electrode connected to one of the scanning lines and (ii) one of a source electrode and a drain electrode connected to the gate electrode of the drive transistor; a second transistor having (i) a gate electrode connected to the scanning line, (ii) one of a source electrode and a drain electrode connected to the other of the source electrode and the drain electrode of the first transistor, and (iii) the other of the source electrode and the drain electrode connected to the data line; and a third transistor having (i) a gate electrode connected to the one of the source electrode and the drain electrode of the first transistor, (ii) a source electrode connected to the other of the source electrode and the drain electrode of the first transistor, and (iii) a drain electrode connected to a first potential line; includes writing a charge in the capacitor; reading the written charge from the capacitor; and holding the charge for a predetermined period from an end of the writing to a start of the reading.

According to the above-described aspect, the active-matrix substrate described above is configured to prevent a change in a potential at a connecting point of the first transistor and the second transistor which are two selection transistors connected in series. More specifically, a third transistor which is a guard potential transistor is disposed such that the potential at the above-described connecting point does not change even when an off-leakage current is generated in the first and the second transistors. With this configuration, current flows between the first potential line and the above-described connecting point according to the voltage difference between the gate and the source of the third transistor, which is generated due to the off-leakage current. More specifically, this current maintains the potential of the above-described connecting point at the potential before the change.

Accordingly, when the capacitor holds the voltage, the potential at the capacitor is maintained without change, and a voltage corresponding to an accurate data voltage can be held, allowing the light-emitting device to emit light at a desired luminance. Furthermore, it is not necessary to design the electrodes of the capacitor to be large in consideration of a change in the voltage caused by the off-leakage current, and thus the area of the electrodes of the capacitor can be reduced, allowing miniaturization of the pixels.

In addition, according to the above-described aspect, when inspecting the above-described active-matrix substrate, a predetermined period for holding is provided between the writing of a charge in the capacitor and the reading of the charge from the capacitor. With this configuration, it is possible to cause a leakage of a charge from the capacitor or an overcharge to the capacitor when the third transistor is faulty. Accordingly, since the amount of charge written in the capacitor changes when the element is faulty, it is possible to correctly determine whether or not the pixel includes the element that is faulty, by reading the charge from the capacitor.

In addition, in the holding, the charge may be held for a period equal to or longer than a period based on a time constant defined by an off resistance of the first transistor, an off resistance of the second transistor, and the capacitor.

According to the above-described aspect, since the value based on a time constant of the circuit configuring the path through which the charge leaks is used when the third transistor is faulty, it is possible to cause a leakage of charge sufficiently, allowing correctly determining the pass or fail of the pixel.

In addition, in the holding, the charge may be held for a period equal to or longer than one millisecond.

According to this aspect, since the period of one millisecond or longer is provided, it is possible to cause a leakage of charge sufficiently when the third transistor is faulty, allowing correctly determining the pass or fail of the pixel.

In addition, the inspection method may include determining that the pixel having the capacitor is unacceptable when an amount of charge written in the capacitor in the writing and an amount of charge read from the capacitor in the reading are different from each another. According to the this aspect, it is possible to correctly determine the pass or fail of the pixel easily, simply by comparing the amount of charge written in the capacitor and the amount of charge read from the capacitor.

In addition, the drive transistor, the first transistor, the second transistor, and the third transistor may be n-type transistors, the first potential line may be the power line whose potential with respect to a reference potential is set to be equal to or higher than a highest voltage held by the capacitor, the charge may be written in the capacitor from the power line in the writing, the charge written in the capacitor from the data line may be read in the reading, and the data line may be maintained at a low level for the predetermined period in the holding.

According to this aspect, since the power line is used for writing a charge and the data line is used for reading the charge, it is possible to perform one-pass inspection In addition, the drive transistor, the first transistor, the second transistor, and the third transistor may be p-type transistors, the first potential line may be the scanning line, the charge may be written in the capacitor from the data line in the writing, the charge written in the capacitor from the data line may be read in the reading, and the data line may be maintained at a low level for the predetermined period in the holding.

According to this aspect, it is possible to correctly determine the pass or fail of the pixel even when each of the transistors included in the pixel is the p-type.

In addition, active-matrix substrate may include a fourth transistor having a gate electrode connected to a drain electrode that is connected to the other of the source electrode and the drain electrode of the first transistor, and a source electrode connected to a second potential line.

According to this aspect, in addition to the introduction of the guard potential to the above-described connecting point, the connecting point is connected to the second potential line via the diode-connected fourth transistor, such that the connecting point has a function of reducing voltage variation. Accordingly, when the voltage of the data line is higher than the writing voltage (when all of the transistors are the n-type) or when the voltage of the data line is lower than the writing voltage (when all of the transistors are the p-type), current flows between the second potential line and the above-described connecting point, allowing the potential at the connecting point to be maintained constant. More specifically, since the provision of the fourth transistor maintains the potential at the above-described connecting point to be constant regardless of the amount of the voltage of the data line, it is possible to maintain the potential of the capacitor to be constant when the capacitor holds the voltage. As described above, it is possible to correctly determine the pass or fail of the pixel even when the active-matrix substrate further includes the fourth transistor.

In addition, the fourth transistor may be an n-type transistor, the second potential line may be a second power line whose potential with respect to a reference potential is set to be equal to or lower than a lowest voltage held by the capacitor, the charge may be written in the capacitor from the power line in the writing, the charge written in the capacitor from the data line may be read in the reading, and the data line may be maintained at a high level for the predetermined period in the holding.

According to this configuration, since the power line is used for writing a charge and the data line is used for reading the charge, it is possible to perform one-pass inspection.

In addition, the second potential line may be connected to an anode electrode of the light-emitting device.

According to this configuration, a power supply that is set to the potential equal to or lower than the lowest voltage held in the capacitor does not have to be separately provided, and instead, the anode electrode of the light-emitting device which meets the above-described potential condition may be used. According to this configuration, the pixel circuit can be simplified. Accordingly, it is possible to correctly determine the pass or fail of the pixel even in the active-matrix substrate that is further simplified.

In addition, the fourth transistor may be a p-type transistor, the second potential line may be the power line whose potential with respect to a reference potential is set to be equal to or higher than a highest voltage held by the capacitor, the charge may be written in the capacitor from the data line in the writing, the charge written in the capacitor from the data line may be read in the reading, and the data line may be maintained at a low level for the predetermined period in the holding.

According to this configuration, it is possible to correctly determine the pass or fail of the pixel even when each of the transistors included in the pixel is the p-type.

According to another exemplary embodiment of the present disclosure, an inspection method for an active-matrix substrate including a plurality of scanning lines, a plurality of data lines, a plurality of pixels each disposed at an intersection of one of the scanning lines and one of the data lines, and a power line for supplying current to the pixels, in which each of the pixels includes: a light-emitting device which emits light according to a flow of a drive current corresponding to a data voltage; a drive transistor which is connected between the power line and the light-emitting device and which converts the data voltage into the drive current, according to a voltage applied to a gate electrode; a capacitor which has one electrode connected to the gate electrode of the drive transistor and which holds a voltage corresponding to the data voltage; a first transistor having (i) a gate electrode connected to one of the scanning lines and (ii) one of a source electrode and a drain electrode connected to the gate electrode of the drive transistor; a second transistor having (i) a gate electrode connected to the scanning line, (ii) one of a source electrode and a drain electrode connected to the other of the source electrode and the drain electrode of the first transistor; a fifth transistor having (i) a gate electrode connected to the scanning line, (ii) one of a source electrode and a drain electrode connected to the other of the source electrode and the drain electrode of the second transistor, and (iii) the other of the source electrode and the drain electrode is connected to the data line; a third transistor having (i) a gate electrode connected to the one of the source electrode and the drain electrode of the first transistor, (ii) a source electrode connected to the other of the source electrode and the drain electrode of the first transistor, and (ii) a drain electrode connected to a first potential line; and a fourth transistor having a gate electrode connected to a drain electrode that is connected to the other of the source electrode and the drain electrode of the second transistor, and a source electrode connected to a second potential line, may include: writing a charge in the capacitor; reading the written charge from the capacitor; and holding the charge for a predetermined period from an end of the writing to a start of the reading.

According to this configuration, since the second transistor is disposed between the first connecting point to which the guard potential is introduced and the second connecting point connected to the second potential line via the fourth transistor, the potential at the first connecting point is maintained constant while suppressing the power consumption, without the flow-through current flowing between the first potential line and the second potential line. As described above, it is possible to correctly determine the pass or fail of the pixel even when the active-matrix substrate further includes the fifth transistor. In addition, in the holding, the charge may be held for a period equal to or longer than a period based on a time constant defined by an off resistance of the first transistor, an off resistance of the second transistor, and the capacitor.

According to this configuration, since the value based on a time constant of the circuit configuring the path through which a charge leaks is used when any of the elements are faulty, it is possible to cause a leakage of charge or an overcharge sufficiently, allowing correctly determining the pass or fail of the pixel.

In addition, in the holding, the charge may be held for a period equal to or longer than one millisecond.

According to this configuration, since the period of one millisecond or longer is provided, it is possible to cause the leakage of charge or the overcharge sufficiently when any of the elements are faulty, allowing correctly determining the pass or fail of the pixel.

In addition, the inspection may further include determining that the pixel having the capacitor is unacceptable when an amount of charge written in the capacitor in the writing and an amount of charge read from the capacitor in the reading are different from each another. According to this configuration, it is possible to correctly determine the pass or fail of the pixel easily, simply by comparing the amount of charge written in the capacitor and the amount of charge read from the capacitor.

In addition, the drive transistor, the first transistor, the second transistor, the third transistor, the fourth transistor, and the fifth transistor may be n-type transistors, the first potential line may be the power line whose potential with respect to a reference potential is set to be equal to or higher than a highest voltage held by the capacitor, the second potential line may be a second power line whose potential with respect to the reference potential is set to be equal to or lower than a lowest voltage held by the capacitor, in the writing, the charge may be written in the capacitor from the power line, in the reading, the charge written in the capacitor from the data line may be read, and in the holding, the data line may be maintained at a high level for the predetermined period.

According to this configuration, since the power line is used for writing a charge and the data line is used for reading the charge, it is possible to perform a one-pass inspection In addition, the drive transistor, the first transistor, the second transistor, the third transistor, the fourth transistor, and the fifth transistor may be p-type transistors, the first potential line may be the scanning line, the second potential line may be the power line whose potential with respect to a reference potential may be set to be equal to or higher than a highest voltage held by the capacitor, the charge may be written in the capacitor from the data line in the writing, the charge written in the capacitor from the data line may be read in the reading, and the data line may be maintained at a low level for the predetermined period in the holding.

According to this configuration, it is possible to correctly determine the pass or fail of the pixel even when each of the transistors included in the pixel is the p-type.

[Embodiment 1]

An inspection method according to an embodiment of the present disclosure will be described below with reference to the drawings. FIG. 1 is a diagram illustrating a circuit configuration of a pixel and connections with circuits around the pixel included in a display device according to Embodiment 1 of the present disclosure. A display device 1 in this diagram includes: a pixel 1*a*; a data line drive circuit 8; a scanning line drive circuit 9; a data line 11; a scanning line 12; and power lines 19 and 20. A single pixel 1*a* is shown in FIG. 1 for convenience; however, the pixel 1*a* is disposed at each of the intersections of the scanning lines 12 and the data lines 11 in a matrix to configure a display unit. In addition, the data line 11 is disposed for each column of the pixels and for each row of the pixel.

The pixel la includes: an organic EL device 13; a drive transistor 14; a capacitor 15; selection transistors 16 and 17; and a guard potential transistor 18.

The scanning line drive circuit 9 is a drive circuit connected to the scanning lines 12, and has a function of controlling conduction and non-conduction of the selection transistors 16 and 17 included in the pixel 1*a,* one row at a time.

The data line drive circuit 8 is a drive circuit connected to the data lines 11, and has a function of outputting a data voltage based on a video signal, to the pixel 1*a*.

The data line 11 is connected to the data line drive circuit 8 and to each of the pixels that belong to a column of pixels including the pixel 1*a*, and has a function of supplying a data voltage that determines the intensity of light emission.

The scanning line 12 is connected to the scanning line drive circuit 9 and to each of the pixels that belong to a row of pixels including the pixel 1*a*. The above-described configuration enables the scanning line 12 to provide the timing for writing the data voltage into each of the pixels that belong to the row of pixels including the pixel 1*a*.

The selection transistor 16 is an example of a first transistor having the gate electrode connected to the scanning line 12 and one of the source electrode and the drain electrode connected to the gate electrode of the drive transistor 14, and switches between conduction and non-conduction, in response to a scanning signal from the scanning line 12, between the data line 11 and the pixel 1*a* in synchronization with the selection transistor 17. The selection transistor 16 is configured of an n-type thin film transistor (n-type TFT).

The selection transistor 17 is a second transistor having the gate electrode connected to the scanning line 12 and one of the source electrode and the drain electrode connected to the other of the source electrode and the drain electrode of the selection transistor 16, and switches between conduction and non-conduction, in response to a scanning signal from the scanning line 12, between the data line 11 and the pixel 1*a* in synchronization with the selection transistor 16. The selection transistor 17 is configured of an n-type thin film transistor (n-type TFT).

In the description below, a connecting point of: the other of the source electrode and the drain electrode of the selection transistor 16; and the one of the source electrode and the drain electrode of the selection transistor 17, is referred to as a first connecting point. In addition, a connecting point of: the one of the source electrode and the drain electrode of the selection transistor 16; the first electrode of the capacitor 15; and the gate electrode of the drive transistor 14 is referred to as a capacitor connecting point.

The drive transistor 14 has the drain electrode connected to the power line 19 that is a positive power line, and the source electrode connected to the anode electrode of the organic EL device 13. The drive transistor 14 converts the voltage corresponding to the data voltage applied between the gate and the source into a drain current corresponding to the data voltage. Then, the drain current is supplied as a drive current to the organic EL device 13. The drive transistor 14 is configured of an n-type thin film transistor (n-type TFT).

The organic EL device 13 is a light-emitting device having a cathode electrode connected to the power line 20 set to the reference potential or the ground potential, and emits light according to a flow of the above-described drive current caused by the drive transistor 14. In the description below, the potential difference from the above-described reference potential is defined as a potential at each line, electrode, or connecting point.

The capacitor 15 has the first electrode which is one of the electrodes and which is connected to the gate electrode of the drive transistor 14, and the second electrode connected to the source electrode of the drive transistor 14. The capacitor 15 holds a voltage corresponding to the data voltage, and has a function of stably holding the gate-source voltage of the drive transistor 14 after the selection transistors 16 and 17 are turned off, for example, to stabilize the drive current supplied from the drive transistor 14 to the organic EL device 13.

Note that, in the case of the active-matrix display device, large capacitance of the capacitor 15 is required for maintaining light-emission state in one frame period. Accordingly, there is an increase in the occupation area ratio of the capacitor 15 to the pixel. Therefore, reduction of the electrode area of the capacitor 15 is important for miniaturization of the pixel accompanying the increase in the definition of the display screen.

The guard potential transistor 18 is an example of the third transistor which has: the gate electrode connected to one of the source electrode and the drain electrode of the selection transistor 16; the source electrode connected to the other of the source electrode and the drain electrode of the selection transistor 16; and the drain electrode connected to the power line 19. The guard potential transistor 18 is configured of an n-type thin film transistor (n-type TFT).

The power line 19 is set to a potential equal to or higher than the highest voltage held by the capacitor 15. This connection allows the guard potential transistor 18 to cause a current corresponding to the gate-source voltage ($V_G$-$V_{P1}$) generated by the off-leakage current that flows from one of the source electrode and the drain electrode of the selection transistor 16 to the other, to flow from the power line 19 through the guard potential transistor 18, the first connecting point, the selection transistor 17, to the data line 11, when the selection transistors 16 and 17 are off and the capacitor 15 is holding a voltage. This current maintains the potential $V_{p1}$ of the first connecting point at the potential before the off-leakage current is generated. The above-described current flows corresponding to the amount of the gate-source voltage ($V_G$-$V_{P1}$) of the guard potential transistor 18. More specifically, when the potential $V_{P1}$ at the first connecting point is about to decrease due to the leakage from the capacitor 15, the gate-source voltage ($V_G$-$V_{P1}$) increases and the current from the power line 19 increases. With this configuration, it is possible to reset the potential $V_{p1}$ of the first connecting point to the original value.

Accordingly, when the capacitor 15 holds a voltage, the potential $V_G$ of the capacitor connecting point does not change and thus a voltage corresponding to an accurate data voltage can be held, allowing the organic EL device 13 to emit light at a desired luminance. This means that $V_{p1}$ serves as the guard potential of $V_G$. Furthermore, it is not necessary to design the electrodes of the capacitor 15 to be large in consideration of voltage variation caused by the off-leakage current, and thus the area of the electrodes of the capacitor can be reduced compared to the conventional configuration, allowing miniaturization of the pixels.

When the guard potential transistor 18 functions properly as described above, the drain-source voltage of the selection transistor 16 is the potential difference only for the threshold voltage of the guard potential transistor 18, and thus it is possible to prevent leakage of charge from the capacitor 15.

Note that the guard potential transistor 18 may have the drain electrode connected to the first potential line different from the power line 19. In this case as well, the first potential line needs to be set to a potential equal to or higher than the highest voltage held by the capacitor 15. Note that the number of fixed potential lines can be reduced by using the power line 19 as the first potential line as in this embodiment, and thus it is possible to simplify the circuit configuration.

In addition, although not illustrated in FIG. 1, each of the power lines 19 and 20 is connected to other pixels as well, and to the voltage source.

The following describes an inspection method for the display device 1 according to Embodiment 1 of the present disclosure. The term inspection here refers to determining the pass or fail of each of the pixels 1*a*. To be more specific, it is determined whether or not each of the elements (the transistor and the capacitor) included in the pixels 1*a* is faulty.

Note that the inspection method performed for the display device 1 is described here, and this is applied also to the method of inspecting an active-matrix substrate which does not include the data line drive circuit 8 and the scanning line drive circuit 9. More specifically, the active-matrix substrate includes: the scanning lines 12; the data lines 11; the pixels 1*a*; and the power lines 19 and 20. The determination of the pass or fail of the pixel 1*a* can also be implemented by connecting the active-matrix substrate to an external data line drive circuit and an external scanning line drive circuit to drive the scanning line 12 and the data line 11, as described below. This applies to the modification of the embodiment and to other embodiments below as well.

Figure 2:
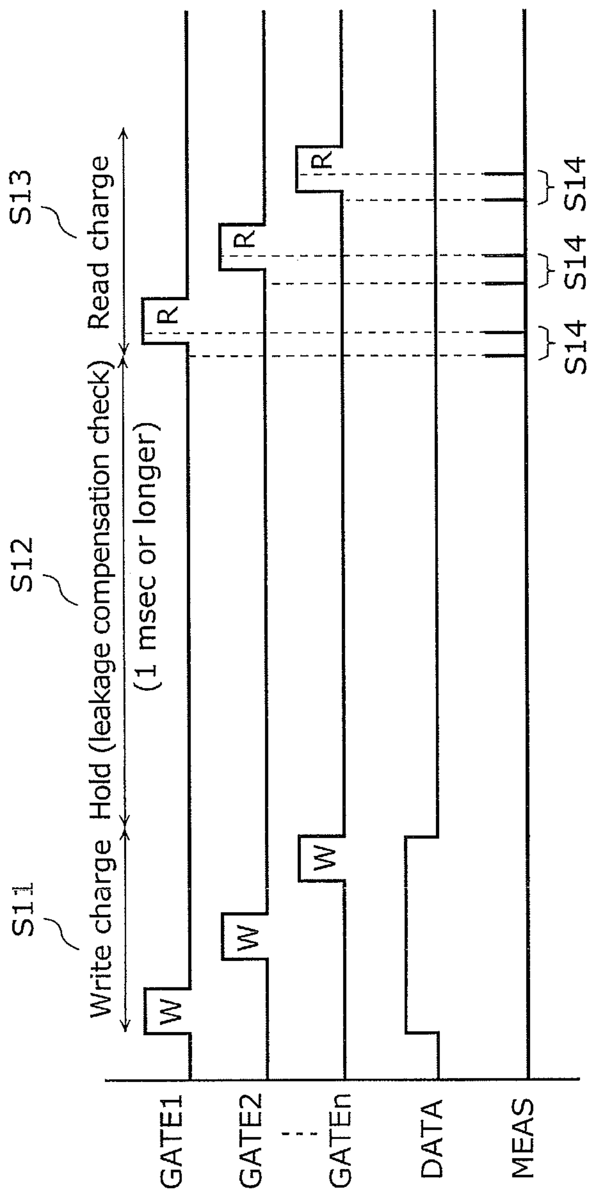
FIG. 2 is a timing chart illustrating an example of an inspection method according to Embodiment 1 of the present disclosure.

FIG. 2 is a timing chart illustrating an example of the inspection method according to Embodiment 1 of the present disclosure. In addition, FIG. 3 is a circuit diagram illustrating an exemplary state when the inspection method according to Embodiment 1 of the present disclosure is executed.

First, a writing process for writing a charge in the capacitor 15 is performed (S11). In this embodiment, a charge is written in the capacitor 15 from the power line 19. More specifically, the charge is sequentially written for each row from the power line 19 into the capacitor 15 included in each of the pixels 1*a*, as shown in FIG. 2. Note that GATE1 to GATEn denote the potentials of n scanning lines 12 in FIG. 2. DATA denotes the potential of the data line 11.

Figure 3:
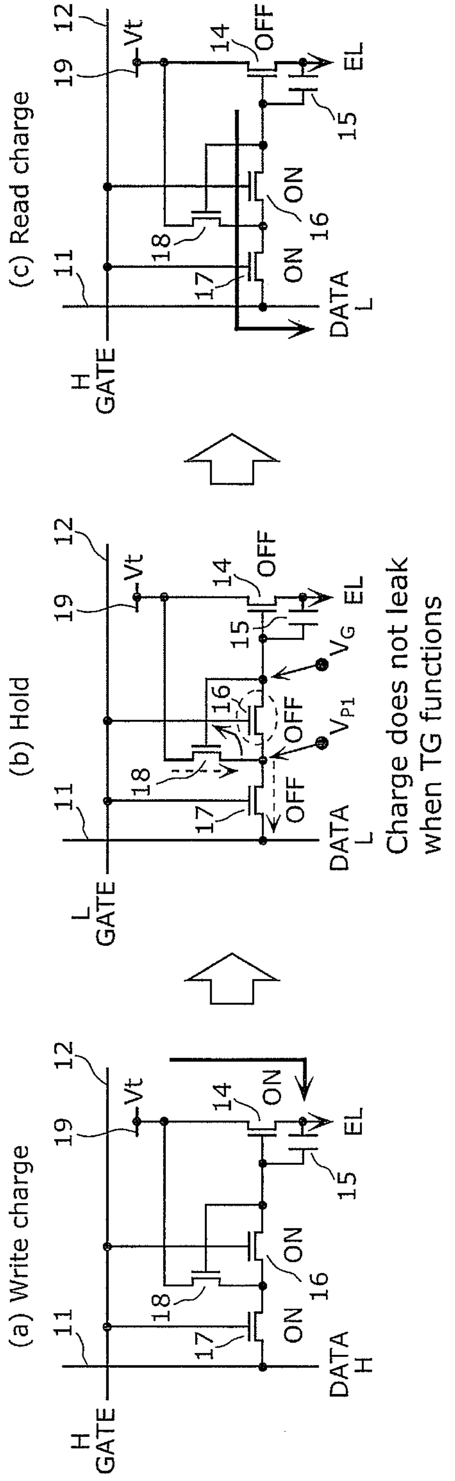
FIG. 3 is a circuit diagram illustrating an exemplary state when the inspection method according to Embodiment 1 of the present disclosure is executed.

More specifically, the scanning line drive circuit 9 changes the scanning line 12 to a high level and the selection transistors 16 and 17 are turned on as shown in FIG. 3(*a*). This brings the data line 11 and the capacitor connecting point into conduction. Note that, since the gate-source voltage is approximately 0, the guard potential transistor 18 does not operate, and thus in the off state.

At this time, since the data line 11 is in the high level due to the data line drive circuit 8, the drive transistor 14 is turned on as shown in FIG. 3(*a*). This brings the second electrode of the capacitor 15 and the power line 19 into conduction. Since the power line 19 is set to the predetermined potential Vt, a charge corresponding to the potential difference between the potential of the data line 11 and the potential of the power line 19 is written in the capacitor 15.

Next, a holding process for holding the charge for a predetermined period from the end of the writing process to the start of a reading process described below is performed (S12). The term holding the charge (hold) here refers to standing by for a predetermined period without driving the scanning line 12 and the data line 11. To be specific, the scanning line 12 is maintained at a low level, so that the selection transistors 16 and 17 are turned off to cause the capacitor 15 to hold the charge.

At this time, in the case where the guard potential transistor 18 functions properly, in other words, in the case where the guard potential transistor 18 is not faulty, current is caused to flow from the power line 19 so as to maintain the potential $V_{p1}$ of the first connecting point as shown in FIG. 3(*b*). This prevents leakage of charge from the capacitor 15 or to the capacitor 15.

Here, the predetermined period is a period of time sufficient for causing the leakage of charge (leak) in the case where the guard potential transistor 18 is faulty. The predetermined period is, for example, a period of a millisecond order. To be specific, the predetermined period is a period equal to or longer than one millisecond. Alternatively, the predetermined period is equal to or longer than a time constant defined by the off resistance of the selection transistor 16, the off resistance of the selection transistor 17, and the capacitor 15, or a period equal to or longer than a period based on the time constant. The period based on the time constant is a period determined based on the rate of charges that leak thorough the selection transistors 16 and 17 when the guard potential transistor 18 is faulty, for example.

When the off resistance of the selection transistor 16 is $R_1$, the off resistance of the selection transistor 17 is $R_2$, and the capacitance of the capacitor 15 is C, the time constant at the time when the charge written in the capacitor 15 is reduced to 90% is $0.1054 \times C \times (R_1+R_2)$. As an example, when $C=10^{-13}$, $R1=R2=2\times10^{12}$, the time constant which is the predetermined period is 21 ms.

Although the time constant when the charge is 90% is the predetermined period in this example, the time constant only needs to be the degree with which the leakage of charge can be detected. The time constant in the case where the charge is reduced to 95%, or to 80% or smaller may be used.

In addition, the charge might increase due to overcharge of the capacitor 15 as in the case where the guard potential transistor 18 is in a short circuit condition (short circuit) due to fault, and thus the predetermined period may be, for example, the time constant at the time when the charge is 110% or larger.

Note that, in the holding process, the data line 11 is, for example, maintained at the low level in a predetermined period as shown in FIG. 2. With this configuration, it is possible to facilitate leakage of charge from the capacitor 15 when the guard potential transistor 18 is in an open circuit condition (open circuit) due to fault. Accordingly, since leakage of charge can be caused in a shorter period, the predetermined period of the holding process can be shortened, enabling the inspection to be completed rapidly.

Next, a process of reading the written charge from the capacitor 15 is performed (S13). In this embodiment, the charge written in the capacitor 15 is read from the data line 11. More specifically, the charge is sequentially read for each row from the capacitor 15 included in each of the pixels 1*a* via the data line 11, as shown in FIG. 2.

First, the scanning line drive circuit 9 changes the scanning line 12 to the high level and the selection transistors 16 and 17 are turned on as shown in FIG. 3(*c*). This brings the data line 11 and the capacitor connecting point into conduction. The data line 11 is set to the low level, and thus the charge is read from the capacitor 15 via the data line 11.

Next, determination of the charge that is read is carried out (S14). More specifically, the amount of charge written in the capacitor 15 in the writing process and the amount of charge read from the capacitor 15 in the reading process are compared. When the amount of charge written in the capacitor 15 in the writing process and the amount of charge read from the capacitor 15 in the reading process are different, the pixel 1*a* including the capacitor 15 is determined as being unacceptable. When the amount of charge written in the capacitor 15 in the writing process and the amount of charge read from the capacitor 15 in the reading process are the same, the pixel 1*a* including the capacitor 15 is determined as being acceptable.

Note that MEAS denotes a timing of measuring a potential in FIG. 2. The potential of the data line 11 when the scanning line 12 is in the low level and the potential of the data line 11 when the scanning line 12 is in the high level, that is, the potential of the capacitor connecting point are measured for each of the scanning lines 12. The potential difference corresponds to the amount of the charge held in the capacitor 15.

Figures 4, 5:
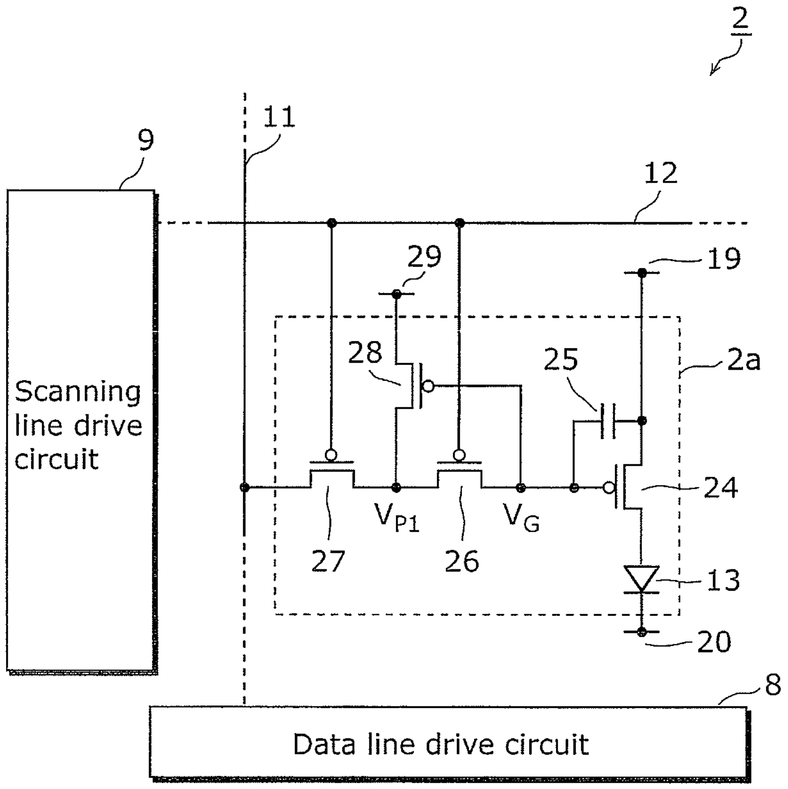
FIG. 4 is a diagram illustrating an example of the relationship between the pass or fail of each of the elements and a charge that is read in the inspection method according to Embodiment 1 of the present disclosure.
FIG. 5 is a diagram illustrating an example of a circuit configuration of a pixel and connections with circuits around the pixel included in a display device according to a modification of Embodiment 1 of the present disclosure.

FIG. 4 is a diagram illustrating an example of the relationship between the pass or fail of each of the elements and the value of the charge that is read in the inspection method according to Embodiment 1 of the present disclosure.

The drive transistor 14 is not turned on in the writing process when the selection transistor 16 ($T_{S1}$) is in the open circuit condition, and thus the charge cannot be written in the capacitor 15. Accordingly, the amount of charge to be read is approximately 0. In addition, when the selection transistor 16($T_{S1}$) is in the short circuit condition, the guard potential transistor 18 is diode connected, and the charge is written from the power line 19 into the capacitor 15 in the holding process. For this reason, the amount of charge to be read is a value higher than a reference value ("higher than reference value" in FIG. 4). Note that the reference value, to be specific, corresponds to the amount of charge written in the capacitor 15 in the writing process. The drive transistor 14 is not turned on in the writing process when the selection transistor 17 ($T_{S2}$) is in the open circuit condition, and thus the charge cannot be written in the capacitor 15. Accordingly, the amount of charge to be read is approximately 0. In addition, the amount of charge to be read is the value lower than the reference value when the selection transistor 17 ($T_{S2}$) is in the short circuit condition.

When the guard potential transistor 18 ($T_G$) is in the open circuit condition, the charge written in the capacitor 15 leaks to the data line 11 through the selection transistors 16 and 17. For this reason, the amount of charge to be read is the value lower than the reference value ("lower than reference value" in FIG. 4). In addition, when the guard potential transistor 18 ($T_G$) is in the short circuit condition, the charge is written from the power line 19 through the selection transistor 16 (overcharge). For this reason, the amount of charge to be read is the value higher than the reference value.

When the drive transistor 14 ($T_d$) is in the open circuit condition, the power line 19 and the second electrode of the capacitor 15 are in the non-conductive state in the writing process, and thus the charge cannot be written in the capacitor 15. Accordingly, the amount of charge to be read is approximately 0. In addition, when the drive transistor 14 ($T_d$) is in the short circuit condition, the charge is written in the capacitor 15 from the power line 19 in the holding process. For this reason, the amount of charge to be read is the value higher than the reference value.

When the capacitor 15 (C) is in the open circuit condition or in the short circuit condition, the charge cannot be written in the capacitor 15. Accordingly, the amount of charge to be read is approximately 0. Note that, when each of the elements is neither in the open circuit condition nor in the short circuit condition, in other words, when each of the elements functions properly, the amount of charge to be read is the same as the reference value.

As described above, the inspection method according to Embodiment 1 of the present disclosure includes: the writing process for writing a charge in the capacitor 15; the reading process for reading the charge from the capacitor 15; and the holding process for holding the charge during a predetermined period from the end of the writing process to the start of the reading process.

The provision of the period for holding the charge by the capacitor 15 makes it possible to cause leakage of charge from the capacitor 15 or overcharge to the capacitor 15 in the case where the guard potential transistor 18 is faulty. With this configuration, it is possible to determine the pass or fail of the guard potential transistor 18.

As described above, with the inspection method according to Embodiment 1 of the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel. Thus, since a new transistor (guard potential transistor) is provided in the pixel in order to prevent generation of an off-leakage current according to Embodiment 1 of the present disclosure, it is possible to determine the pass or fail of this new transistor as well. In addition, as shown in FIG. 4, it is also possible to determine the pass or fail of the elements such as the selection transistor, the drive transistor, and the capacitor which are conventionally provided.

Note that, in Embodiment 1 of the present disclosure, each of the transistors included in the pixel is explained as the n-type. Contrary to this, each of the transistors included in the pixel may be the p-type. FIG. 5 is a diagram illustrating an example of a circuit configuration of a pixel and connections with circuits around the pixel included in a display device according to a modification of Embodiment 1 of the present disclosure.

A display device 2 in FIG. 5 includes: a pixel 2*a*; the data line drive circuit 8; the scanning line drive circuit 9; the data line 11; the scanning line 12; the power lines 19 and 20; and a fixed potential line 29. A single pixel 2*a* is shown in FIG. 5 for convenience, however, the pixel 2*a* is disposed at each of the intersections of the scanning lines 12 and the data lines 11 in a matrix to configure a display unit. In addition, the data line 11 is disposed for each column of the pixels and the scanning line 12 is disposed for each row of the pixels.

The pixel 2*a* includes: the organic EL device 13; the drive transistor 24; the capacitor 25; the selection transistors 26 and 27; and the guard potential transistor 28.

The display device 2 illustrated in FIG. 5 is different, in terms of configuration, from the display device 1 illustrated in FIG. 1 in that the transistors are p-type transistors. In the following description, description will be omitted for the components identical to those in the display device 1, and the description will be made focusing on the differences.

The selection transistor 26 is an example of the first transistor having the gate electrode connected to the scanning line 12 and one of the source electrode and the drain electrode connected to the gate electrode of the drive transistor 24, and switches between conduction and non-conduction, in response to a scanning signal from the scanning line 12, between the data line 11 and the pixel 2*a* in synchronization with the selection transistor 27. The selection transistor 26 is configured of a p-type thin film transistor (p-type TFT). The selection transistor 27 is an example of the second transistor having the gate electrode connected to the scanning line 12 and one of the source electrode and the drain electrode connected to the other of the source electrode and the drain electrode of the selection transistor 26, and switches between conduction and non-conduction, in response to a scanning signal from the scanning line 12, between the data line 11 and the pixel 2*a* in synchronization with the selection transistor 26. The selection transistor 27 is configured of the p-type thin film transistor (p-type TFT).

In the description below, a connecting point of: the other of the source electrode and the drain electrode of the selection transistor 26; and the one of the source electrode and the drain electrode of the selection transistor 27, is referred to as the first connecting point. In addition, a connecting point of: one of the source electrode and the drain electrode of the selection transistor 26; the first electrode of the capacitor 25; and the gate electrode of the drive transistor 24 is referred to as a capacitor connecting point.

The drive transistor 24 has the source electrode connected to the power line 19 that is the positive power line, and the drain electrode connected to the anode electrode of the organic EL device 13. The drive transistor 24 converts the voltage corresponding to the data voltage applied between the gate and the source into a drain current corresponding to the data voltage. Then, the drain current is supplied as a drive current to the organic EL device 13. The selection transistor 24 is configured of the p-type thin film transistor (p-type TFT).

The organic EL device 13 is a light-emitting device having a cathode electrode connected to the power line 20 that is set to the reference potential or the ground potential, and emits light according to a flow of the above-described drive current caused by the drive transistor 24. In the description below, the potential difference from the above-described reference potential is defined as a potential at each line, electrode, or connecting point.

The capacitor 25 has the first electrode which is one of the electrodes and which is connected to the gate electrode of the drive transistor 24, and the second electrode is connected to the source electrode of the drive transistor 24, holds a voltage corresponding to the data voltage, and has a function of stably holding the gate-source voltage of the drive transistor 24 after the selection transistors 26 and 27 are turned off, for example, to stabilize the drive current supplied from the drive transistor 24 to the organic EL device 13.

The guard potential transistor 28 is an example of the third transistor which has: the gate electrode connected to one of the source electrode and the drain electrode of the selection transistor 26; the source electrode connected to the other of the source electrode and the drain electrode of the selection transistor 26; and the drain electrode connected to the fixed potential line 29. The guard potential transistor 28 is configured of the p-type thin film transistor (p-type TFT).

The fixed potential line 29 is set to a potential equal to or lower than the lowest voltage held by the capacitor 25. To be more specific, the fixed potential line 29 is set to a potential lower than the potential of the data line 11. This connection allows the guard potential transistor 28 to cause a current corresponding to the gate-source voltage ($V_G$-$V_{P1}$) generated by the off-leakage current that flows from the other to the one of the source electrode and the drain electrode of the selection transistor 26, to flow from the data line 11 through the selection transistor 27, the first connecting point, the guard potential transistor 28, to the fixed potential line 29, when the selection transistors 26 and 27 are off and the capacitor 25 is holding a voltage. This current maintains the potential $V_{P1}$ of the first connecting point at the potential before the off-leakage current is generated. The above-described current flows corresponding to the amount of the gate-source voltage ($V_G$-$V_{P1}$) of the guard potential transistor 28. More specifically, when the potential $V_{P1}$ of the first connecting point is about to decrease due to the leakage from the capacitor 25, the gate-source voltage ($V_G$-$V_{P1}$) increases and the current from the data line 11 increases. With this configuration, it is possible to reset the potential $V_{P1}$ of the first connecting point to the original value. Accordingly, when the capacitor 25 holds the voltage, the potential $V_G$ of the capacitor connecting point does not change and thus a voltage corresponding to an accurate data voltage can be held, allowing the organic EL device 13 to emit light at a desired luminance. This means that $V_{P1}$ serves as the guard potential of $V_G$. Furthermore, it is not necessary to design the electrodes of the capacitor 25 to be large in consideration of voltage variation caused by the off-leakage current, and thus the area of the electrodes of the capacitor can be reduced compared to the conventional configuration, allowing miniaturization of the pixels.

When the guard potential transistor 28 functions properly as described above, the drain-source voltage of the selection transistor 26 is the potential difference only for the threshold voltage of the guard potential transistor 28, and thus it is possible to prevent leakage of charge from the capacitor 25.

Note that the guard potential transistor 28 may have the drain electrode connected to the scanning line 12 different from the fixed potential line 29. In this case, it is necessary that the scanning line potential when turning off the selection transistors 26 and 27 is set at a potential equal to or lower than the lowest voltage held by the capacitor 25. The number of the fixed potential lines can be reduced by connecting the guard potential transistor 28 to the scanning line 12, and thus it is possible to simplify the circuit configuration.

The following describes an inspection method performed for the display device 2 according to a modification of Embodiment 1 of the present disclosure.

Figure 6:
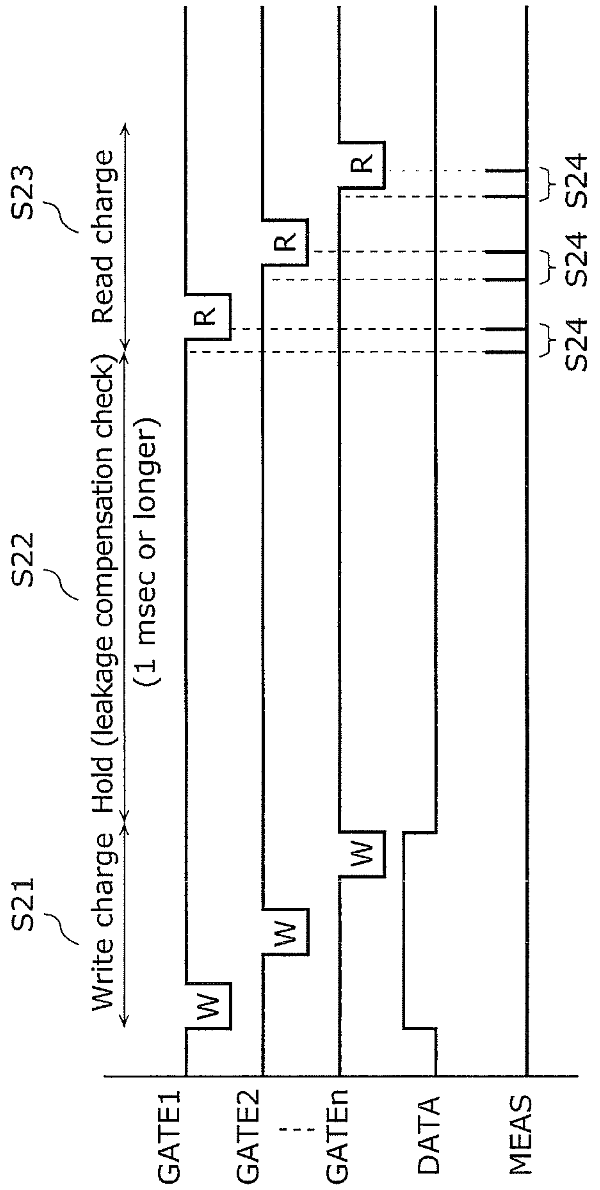
FIG. 6 is a timing chart illustrating an example of an inspection method according to the modification of Embodiment 1 of the present disclosure.
Figure 7:
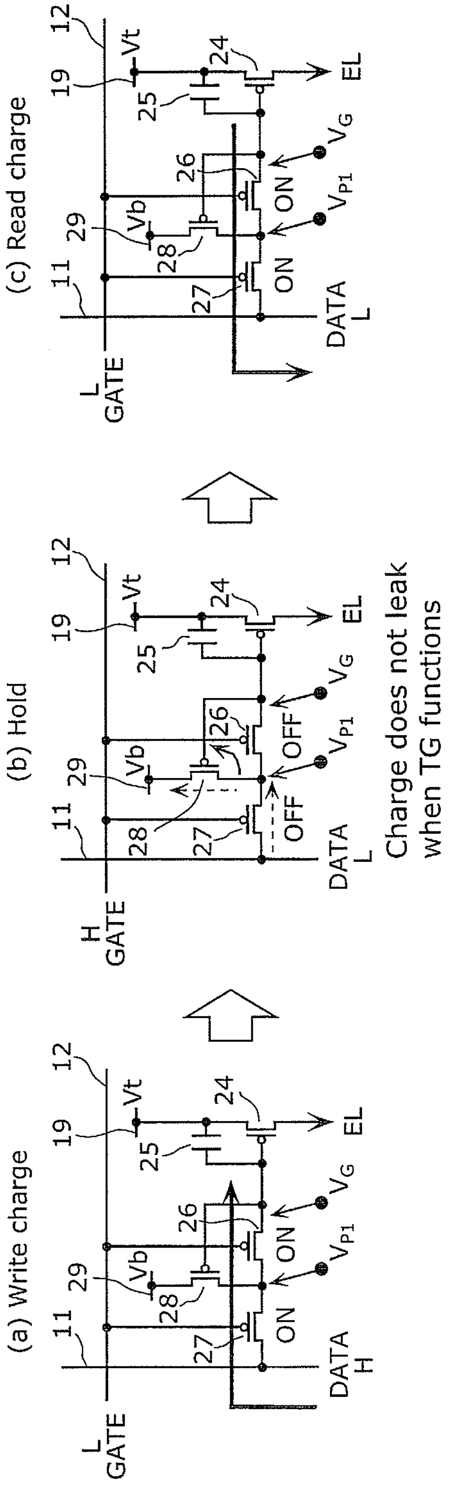
FIG. 7 is a circuit diagram illustrating an exemplary state when the inspection method according to the modification of Embodiment 1 of the present disclosure is executed.

FIG. 6 is a timing chart illustrating an example of the inspection method according to the modification of Embodiment 1 of the present disclosure. In addition, FIG. 7 is a circuit diagram illustrating an exemplary state when the inspection method according to the modification of Embodiment 1 of the present disclosure is executed. First, a writing process for writing a charge in the capacitor 25 is performed (S21). In the modification of this embodiment, a charge is written in the capacitor 25 from the data line 11. More specifically, the charge is sequentially written for each row from the data line 11 into the capacitor 25 included in each of the pixels 2*a,* as shown in FIG. 6.

To be more specific, the scanning line drive circuit 9 changes the scanning line 12 to a low level and the selection transistors 26 and 27 are turned on as shown in FIG. 7(*a*). This brings the data line 11 and the capacitor connecting point into conduction. Since the power line 19 is set to the predetermined potential Vt, charge corresponding to the potential difference between the potential of the data line 11 and the potential of the power line 19 is written in the capacitor 25. Note that, since the gate-source voltage is approximately 0, the guard potential transistor 28 does not operate, and thus in the off state. Next, a holding process for holding the charge for a predetermined period from the end of the writing process to the start of a reading process described below is performed (S22). The term holding the charge (hold) here refers to standing by for a predetermined period without driving the scanning line 12 and the data line 11. To be specific, the scanning line 12 is maintained at a high level, so that the selection transistors 26 and 27 are turned off to cause the capacitor 25 to hold the charge. Here, the predetermined period is set as described above.

At this time, in the case where the guard potential transistor 28 functions properly, in other words, in the case where the guard potential transistor 28 is not faulty, current is caused to flow from the data line 11 so as to maintain the potential $V_{P1}$ of the first connecting point as shown in FIG. 7(*b*). This prevents leakage of charge from the capacitor 25.

Note that, in the holding process, the data line 11, for example, is maintained at the low level in a predetermined period as shown in FIG. 6. With this configuration, it is possible to facilitate leakage of charge from the capacitor 25 when the guard potential transistor 28 is in the open circuit condition. Accordingly, since leakage of charge can be caused in a shorter period, the predetermined period of the holding process can be shortened, enabling the inspection to be completed rapidly.

Next, a reading process for reading the written charge from the capacitor 25 is performed (S23). In the modification of this embodiment, the charge written in the capacitor 25 is read from the data line 11. More specifically, the charge is sequentially read for each row from the capacitor 25 included in each of the pixels 2*a* via the data line 11, as shown in FIG. 6.

First, the scanning line drive circuit 9 changes the scanning line 12 to the low level and the selection transistors 26 and 27 are turned on as shown in FIG. 7(*c*). This brings the data line 11 and the capacitor connecting point into conduction. The data line 11 is set to the low level, and thus the charge is read from the capacitor 25 via the data line 11.

Next, determination of the charge that is read is carried out (S24). More specifically, the amount of charge written in the capacitor 25 in the writing process and the amount of charge read from the capacitor 25 in the reading process are compared. When the amount of charge written in the capacitor 25 in the writing process and the amount of charge read from the capacitor 25 in the reading process are different, the pixel 2*a* including the capacitor 25 is determined as being unacceptable. In addition, when the amount of charge written in the capacitor 25 in the writing process and the amount of charge read from the capacitor 25 in the reading process are the same, the pixel 2*a* including the capacitor 25 is determined as being acceptable.

Figures 8, 9:
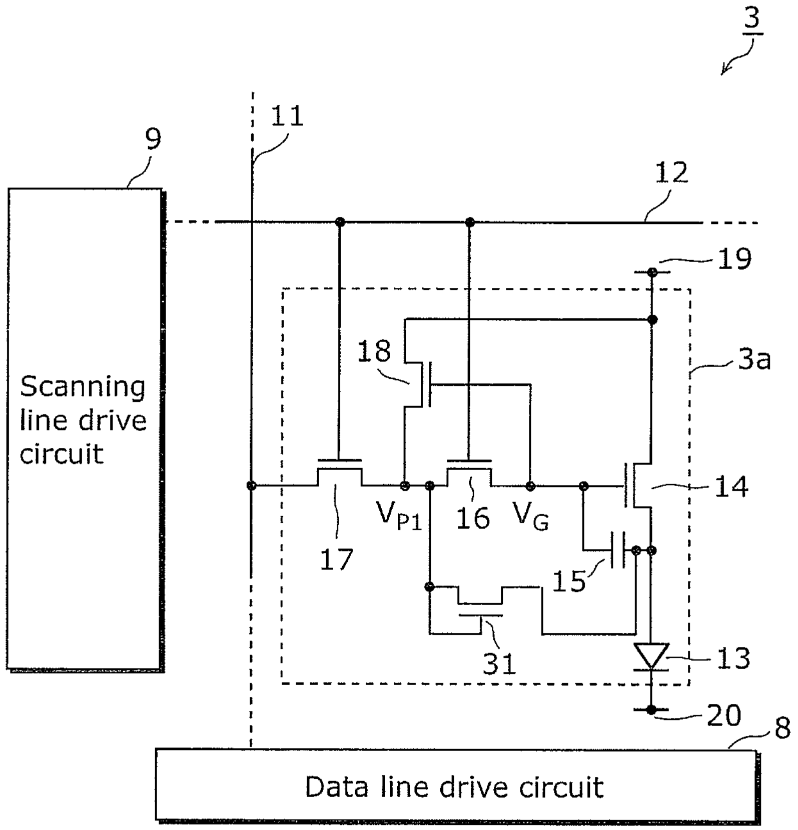
FIG. 8 is a diagram illustrating an example of the relationship between the pass or fail of each of the elements and a charge that is read in the inspection method according to the modification of Embodiment 1 of the present disclosure.
FIG. 9 is a diagram illustrating an example of a circuit configuration of a pixel and connections with circuits around the pixel included in a display device according to Embodiment 2 of the present disclosure.

FIG. 8 is a diagram illustrating an example of the relationship between the pass or fail of each of the elements and the value of the charge that is read in the inspection method according to the modification of Embodiment 1 of the present disclosure.

The drive transistor 24 is not turned on in the writing process when the selection transistor 26 ($T_{s1}$) is in the open circuit condition, and thus the charge cannot be written in the capacitor 25. Accordingly, the amount of charge to be read is approximately 0. In addition, when the selection transistor 26($T_{s1}$) is in the short circuit condition, the guard potential transistor 28 is diode connected, and the charge leaks from the capacitor 25 to the fixed potential line 29 in the holding process. For this reason, the amount of charge to be read is the value lower than the reference value. Note that the reference value, to be specific, corresponds to the amount of charge written in the capacitor 25 in the writing process.

The drive transistor 24 is not turned on in the writing process when the selection transistor 27 ($T_{s2}$) is in the open circuit condition, and thus the charge cannot be written in the capacitor 25. Accordingly, the amount of charge to be read is approximately 0. In addition, the amount of charge to be read is the value lower than the reference value when the selection transistor 27 ($T_{s2}$) is in the short circuit condition.

When the guard potential transistor 28 ($T_G$) is in the open circuit condition, the charge written in the capacitor 25 leaks to the data line 11 through the selection transistors 26 and 27. For this reason, the amount of charge to be read is the value lower than the reference value. In addition, when the guard potential transistor 28 ($T_G$) is in the short circuit condition, the charge leaks to the fixed potential line 29 through the selection transistor 26 and the guard potential transistor 28. For this reason, the amount of charge to be read is the value lower than the reference value.

When the capacitor 25 (C) is in the open circuit condition or in the short circuit condition, the charge cannot be written in the capacitor 25. Accordingly, the amount of charge to be read is approximately 0. Note that, when each of the elements is neither in the open circuit condition nor in the short circuit condition, in other words, when each of the elements functions properly, the amount of charge to be read is the same as the reference value.

Here, the pass or fail of the drive transistor 24 ($T_d$) cannot be determined according to the modification of the present disclosure. Whether or nor the drive transistor 24 is faulty can be determined, for example, by inspecting whether or not a drive current can be supplied to the organic EL device 13, in other words, whether or not the organic EL device 13 emits light at desired luminance.

As described above, the inspection method according to the modification of Embodiment 1 of the present disclosure includes: the writing process for writing a charge in the capacitor 25; the reading process for reading the charge from the capacitor 25; and the holding process for holding the charge for a predetermined period from the end of the writing process to the start of the reading process. The provision of the period for holding the charge by the capacitor 25 makes it possible to cause leakage of charge from the capacitor 25 in the case where the guard potential transistor 28 is faulty. With this configuration, it is possible to determine the pass or fail of the guard potential transistor 28.

As described above, with the inspection method according to the modification of Embodiment 1 of the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel.

[Embodiment 2]

With the display device 1 described in Embodiment 1, it is possible to maintain the potential $V_G$ of the capacitor 15 without reduction when the voltage of the data line 11 is lower than the writing voltage at the time of display operation. With the display device 2 described in the modification of Embodiment 1, it is possible to maintain the potential $V_G$ of the capacitor 25 without increase when the voltage of the data line 11 is higher than the writing voltage at the time of display operation.

However, with the display devices 1 and 2 according to Embodiment 1, when the relationship between the writing voltage and the voltage of the data line 11 is reversed at the time of display operation, the current path by the guard potential transistors 18 and 28 cannot be secured, and thus it is difficult to maintain the potential $V_G$ at the capacitors 15 and 25.

The display device according to this embodiment produces the advantageous effects equivalent to the advantageous effects produced by the display device according to the above-described Embodiment 1 and solves the problem posed by the display device. The following describes Embodiment 2 of the present disclosure with reference to the drawings.

FIG. 9 is a diagram illustrating a circuit configuration of a pixel and connections with circuits around the pixel included in a display device according to Embodiment 2 of the present disclosure. The display device 3 in this diagram includes: the pixel 3*a;* the data line drive circuit 8; the scanning line drive circuit 9; the data line 11; the scanning line 12; and the power lines 19 and 20. A single pixel 3*a* is shown in FIG. 9 for convenience, however, the pixel 3*a* is disposed at each of the intersections of the scanning lines 12 and the data lines 11 in a matrix to configure the display unit. In addition, the data line 11 is disposed for each column of the pixels and the scanning line 12 is disposed for each row of the pixel.

The pixel 3*a* includes: the organic EL device 13; the drive transistor 14; the capacitor 15; the selection transistors 16 and 17; the guard potential transistor 18; and a voltage variation reducing transistor 31. The display device 3 illustrated in FIG. 9 is different, in terms of configuration, from the display device 1 illustrated in FIG. 1 in that the voltage variation reducing transistor 31 is provided. In the following description, description will be omitted for the components identical to those in the display device 1, and the description will be made focusing on the differences.

The voltage variation reducing transistor 31 is an example of a fourth transistor which has: the gate electrode short-circuited with the drain electrode; the drain electrode connected to the other of the source electrode and the drain electrode of the selection transistor 16; and the source electrode connected to the anode electrode of the organic EL device 13. The voltage variation reducing transistor 31 is configured of an n-type thin film transistor (n-type TFT). With the connections described above, the voltage variation reducing transistor 31 is diode-connected and current flows from the drain electrode to the source electrode.

Accordingly, when the capacitor 15 holds a voltage, it is possible to cause current for preventing the potential $V_{P1}$ of the first connecting point from changing, to flow not only through the path from the power line 19 through the guard potential transistor 18, the first connecting point, the selection transistor 17, to the data line 11, but also through the path from the data line 11 through the selection transistor 17, the first connecting point, the voltage variation reducing transistor 31, to the anode electrode of the organic EL device 13. With these current paths, it is possible to maintain the potential of the first connecting point regardless of the amount of the voltage of the data line 11.

The following describes an inspection method for the display device 3 according to Embodiment 2 of the present disclosure.

Figure 10:
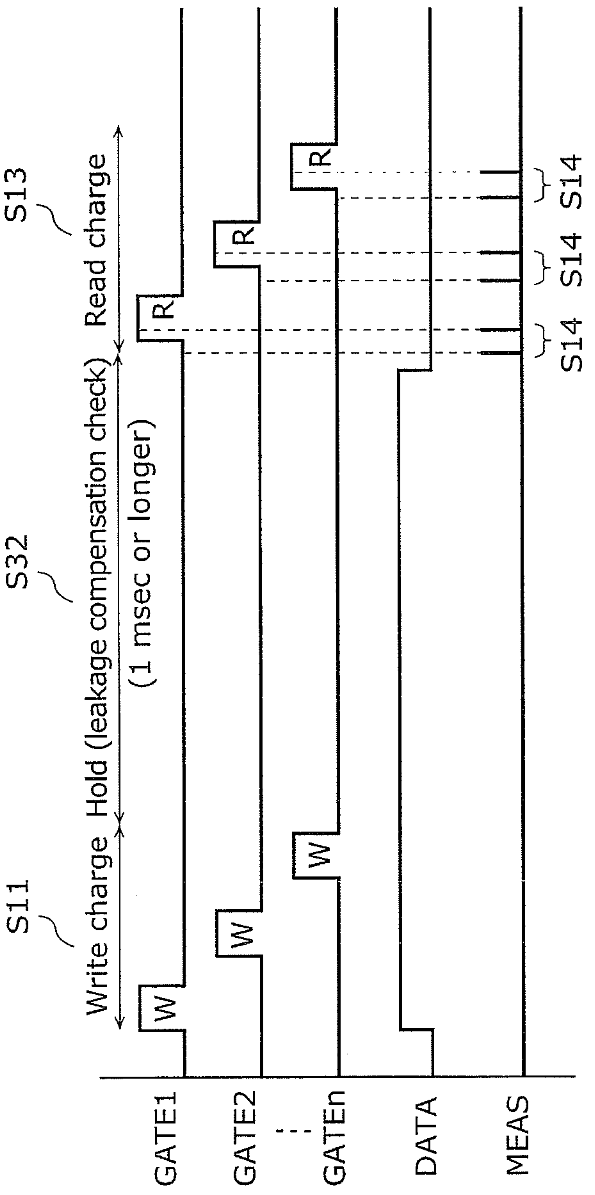
FIG. 10 is a timing chart illustrating an example of an inspection method according to Embodiment 2 of the present disclosure.
Figure 11:
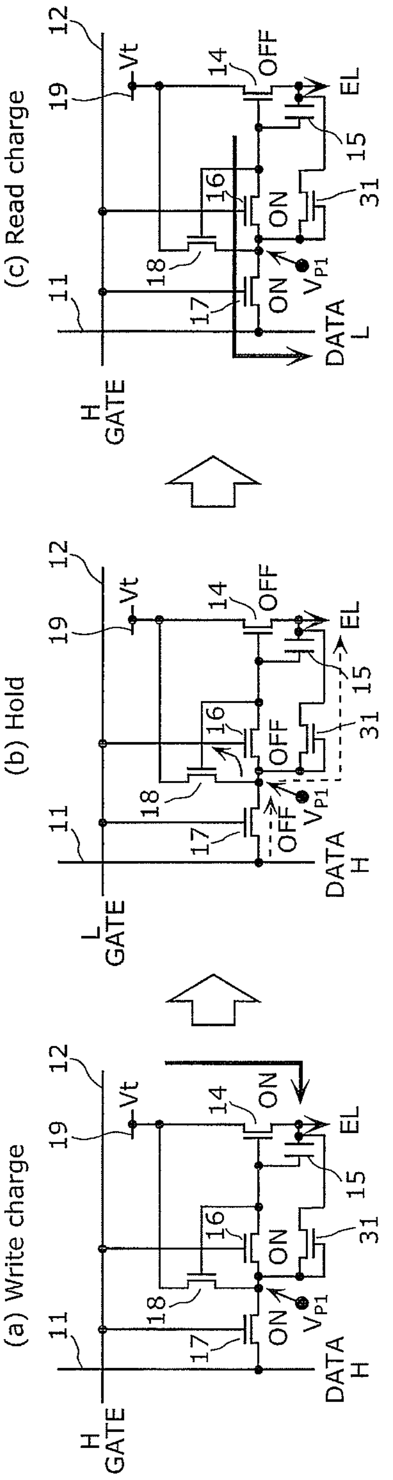
FIG. 11 is a circuit diagram illustrating an exemplary state when the inspection method according to Embodiment 2 of the present disclosure is executed.

FIG. 10 is a timing chart illustrating an example of the inspection method according to Embodiment 2 of the present disclosure. In addition, FIG. 11 is a circuit diagram illustrating an exemplary state when the inspection method according to Embodiment 2 of the present disclosure is executed.

First, a writing process for writing a charge in the capacitor 15 is performed (S11). This writing process is equivalent to the writing process described in Embodiment 1, and thus the description will be omitted (see FIG. 11(*a*)).

Next, a holding process for holding the charge for a predetermined period from the end of the writing process to the start of a reading process is performed (S32). The term holding the charge (hold) here refers to standing by for a predetermined period without driving the scanning line 12 and the data line 11. To be specific, the scanning line 12 is maintained at a low level, so that the selection transistors 16 and 17 are turned off to cause the capacitor 15 to hold the charge. Note that, the predetermined period is equivalent to the predetermined period described in Embodiment 1.

At this time, in the case where the guard potential transistor 18 and the voltage variation reducing transistor 31 function properly, in other words, in the case where they are not faulty, current can flow through the voltage variation reducing transistor 31 so as to maintain the potential $V_{P1}$ of the first connecting point. When the potential of the data line 11 is high as shown in FIG. 11(*b*), for example, a leakage current is caused to flow from the data line 11 through the voltage variation reducing transistor 31, thereby preventing writing of charge into the capacitor 15.

In addition, when the voltage of the data line 11 is low, current can be caused to flow from the power line 19 to the data line 11 and the organic EL device 13 in order to maintain the potential $V_{P1}$ at the first connecting point. With this configuration, it is possible to prevent the leakage of charge from the capacitor 15 in the same manner as in Embodiment 1.

Note that, in this embodiment, the data line 11 is maintained at a high level in the holding process as shown in FIG. 10. At this time, when the guard potential transistor 18 is in the open circuit condition, the charge held in the capacitor 15 leaks to the organic EL device 13 through the selection transistor 16 and the voltage variation reducing transistor 31.

In addition, when the voltage variation reducing transistor 31 is in the open circuit condition, there is no path for the leakage current from the data line 11 to flow. For this reason, a charge is written in the capacitor 15 from the data line 11 (overcharge).

Next, a reading process for reading the written charge from the capacitor 15 is performed (S13). This reading process is equivalent to the reading process in Embodiment 1, and thus the description will be omitted (see FIG. 11(*c*)).

Next, determination of the charge that is read is carried out (S14). More specifically, the amount of charge written in the capacitor 15 in the writing process and the amount of charge read from the capacitor 15 in the reading process are compared. When the amount of charge written in the capacitor 15 in the writing process and the amount of charge read from the capacitor 15 in the reading process are different, the pixel 3*a* including the capacitor 15 is determined as being unacceptable. In addition, when the amount of charge written in the capacitor 15 in the writing process and the amount of charge read from the capacitor 15 in the reading process are the same, the pixel 3*a* including the capacitor 15 is determined as being acceptable.

FIG. 12 is a diagram illustrating an example of the relationship between the pass or fail of each of the elements and the value of the charge that is read in the inspection method according to Embodiment 2 of the present disclosure.

When the voltage variation reducing transistor 31 ($T_L$) is in the open circuit condition, since the data line 11 is set to the high level in the holding process, a charge is written in the capacitor 15 from the data line 11. For this reason, the amount of charge to be read is the value higher than the reference value. In addition, when the voltage variation reducing transistor 31 ($T_L$) is in the short circuit condition, since both of the electrodes of the capacitor 15 are short-circuited in the writing process, a charge cannot be written in the capacitor 15. Accordingly, the amount of charge to be read is approximately 0.

As to the selection transistor 16 ($T_{S1}$), the selection transistor 17 ($T_{S2}$), the guard potential transistor 18 ($T_G$), the drive transistor 14 ($T_d$), and the capacitor 15 (C), they are equivalent to those in Embodiment 1. Note that, when each of the elements is neither in the open circuit condition nor in the short circuit condition, in other words, when each of the elements functions properly, the amount of charge to be read is the same as the reference value.

As described above, the inspection method according to Embodiment 2 of the present disclosure includes: the writing process for writing a charge in the capacitor 15; the reading process for reading the charge from the capacitor 15; and the holding process for holding the charge during the predetermined period from the end of the writing process to the start of the reading process. The provision of the period for holding the charge by the capacitor 15 makes it possible to cause overcharge to the capacitor 15 in the case where the guard potential transistor 31 is faulty. With this configuration, it is possible to determine the pass or fail of the guard potential transistor 31.

As described above, with the inspection method according to Embodiment 2 of the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel. Thus, since new transistors (the guard potential transistor and the voltage variation reducing transistor) are provided in the pixel in order to prevent generation of an off-leakage current according to Embodiment 2 of the present disclosure, it is possible to determine the pass or fail of these new transistors as well. In addition, as shown in FIG. 12, it is also possible to determine the pass or fail of elements such as the selection transistor, the drive transistor, and the capacitor which are conventionally provided.

Note that, in Embodiment 2 of the present disclosure, each of the transistors included in the pixel is explained as the n-type. Contrary to this, each of the transistors included in the pixel may be the p-type. FIG. 13 is a diagram illustrating an example of a circuit configuration of a pixel and connections with circuits around the pixel included in a display device according to a modification of Embodiment 2 of the present disclosure.

A display device 4 in FIG. 13 includes: a pixel 4*a;* the data line drive circuit 8; the scanning line drive circuit 9; the data line 11; the scanning line 12; the power lines 19 and 20; and a fixed potential line 29. A single pixel 4*a* is shown in FIG. 13 for convenience, however, the pixel 4*a* is disposed at each of the intersections of the scanning lines 12 and the data lines 11 in a matrix to configure the display unit. In addition, the data line 11 is disposed for each column of the pixels and the scanning line 12 is disposed for each row of the pixel.

The pixel 4*a* includes: the organic EL device 13; the drive transistor 24; the capacitor 25; the selection transistors 26 and 27; the guard potential transistor 28; and a voltage variation reducing transistor 41. The display device 4 illustrated in FIG. 13 is different, in terms of configuration, from the display device 2 illustrated in FIG. 5 in that the voltage variation reducing transistor 41 is provided. In the following description, description will be omitted for the components identical to those in the display device 2, and the description will be made focusing on the differences.

The voltage variation reducing transistor 41 is an example of the fourth transistor which has: the gate electrode short-circuited with the drain electrode connected to the other of the source electrode and the drain electrode of the selection transistor 26; and the source electrode connected to the power line 19. The selection transistor 41 is configured of the p-type thin film transistor (p-type TFT). With the connections described above, the voltage variation reducing transistor 41 is diode-connected, and a current flows from the drain electrode to the source electrode.

Accordingly, when the capacitor 25 holds the voltage, it is possible to cause the current for preventing the potential $V_{P1}$ of the first connecting point from changing, to flow not only through the path from the data line 11 through the selection transistor 27, the first connecting point, the guard potential transistor 28 to the fixed potential line 29, but also through the path from the power line 19 though the voltage variation reducing transistor 41, the first connecting point, the selection transistor 27 to the data line 11. With these current paths, it is possible to maintain the potential of the above-described connecting point regardless of the amount of the voltage of the data line 11.

Figure 14:
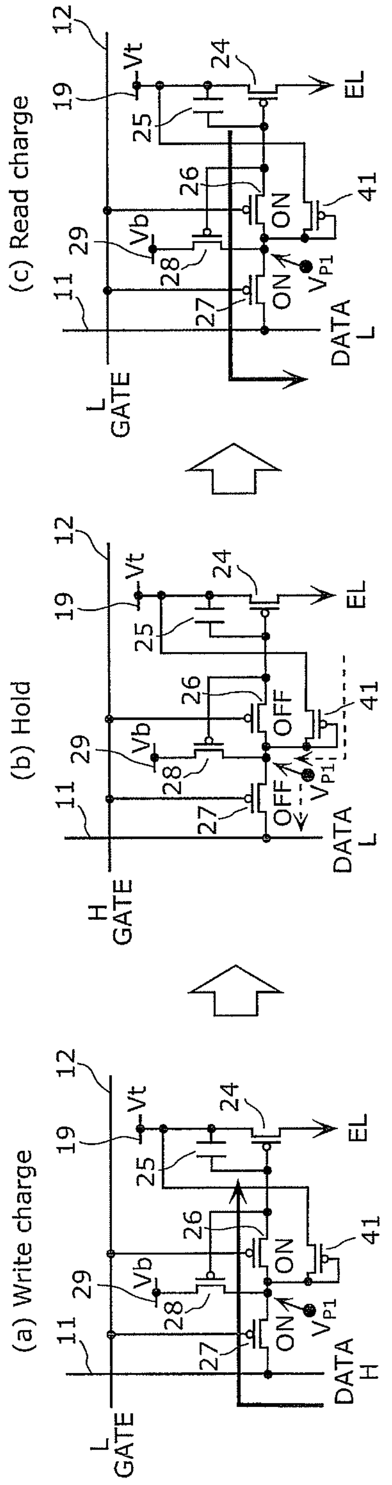
FIG. 14 is a circuit diagram illustrating an exemplary state when the inspection method according to the modification of Embodiment 2 of the present disclosure is executed.

The following describes an inspection method for the display device 4 according to a modification of Embodiment 2 of the present disclosure. FIG. 14 is a circuit diagram illustrating an exemplary state when the inspection method according to the modification of Embodiment 2 of the present disclosure is executed. In addition, the inspection method according to the modification of Embodiment 2 of the present disclosure is executed according to the timing chart illustrating in FIG. 6.

First, a writing process for writing a charge in the capacitor 25 is performed (S21). This writing process is equivalent to the writing process described in the modification of Embodiment 1, and thus the description will be omitted (see FIG. 14(*a*)).

Next, a holding process for holding the charge for a predetermined period from the end of the writing process to the start of a reading process is performed (S22). The term holding the charge (hold) here refers to standing by for a predetermined period without driving the scanning line 12 and the data line 11. To be specific, the scanning line 12 is maintained at a high level, so that the selection transistors 26 and 27 are turned off to cause the capacitor 25 to hold the charge. Note that, the predetermined period is equivalent to the predetermined period described in Embodiment 1.

At this time, in the case where the guard potential transistor 28 and the voltage variation reducing transistor 41 function properly, in other words, in the case where they are not faulty, current can flow through the voltage variation reducing transistor 41 so as to maintain the potential $V_{P1}$ of the first connecting point. For example, when the voltage of the data line 11 is low, it is possible to cause current from the power line 19 to flow into the data line 11 in order to maintain the potential $V_{P1}$ of the first connecting point, as shown in FIG. 14(*b*). In addition, when the potential at the data line 11 is high, it is possible to cause a leakage current from the data line 11 to flow into the fixed potential line 29 through the guard potential transistor 28. With this configuration, it is possible to prevent the leakage of charge from the capacitor 25 in the same manner as in the modification of Embodiment 1.

Note that, in the modification of this embodiment, the data line 11 is maintained at a low level in the holding process as shown in FIG. 6. At this time, when the guard potential transistor 28 is in the open circuit condition, the charge held in the capacitor 25 leaks to the data line 11. In addition, when the guard potential transistor 28 is in the short circuit condition, the charge held in the capacitor 25 leaks to the fixed potential line 29 through the guard potential transistor 28.

In addition, when the voltage variation reducing transistor 41 is in the open circuit condition, since the current for maintaining the potential $V_{P1}$ of the first connecting point does not flow from the power line 19, the charge held in the capacitor 25 leaks to the data line 11 through the selection transistors 26 and 27. In addition, when the voltage variation reducing transistor 41 is in the short circuit condition, charge is written in the capacitor 25 from the power line 19 (overcharge). Next, a reading process for reading the written charge from the capacitor 25 is performed (S23). This reading process is equivalent to the reading process described in the modification of Embodiment 1, and thus the description will be omitted (see FIG. 14(*c*)).

Next, determination of the charge that is read is carried out (S24). More specifically, the amount of charge written in the capacitor 25 in the writing process and the amount of charge read from the capacitor 25 in the reading process are compared. When the amount of charge written in the capacitor 25 in the writing process and the amount of charge read from the capacitor 25 in the reading process are different, the pixel 4*a* including the capacitor 25 is determined as being unacceptable. In addition, when the amount of charge written in the capacitor 25 in the writing process and the amount of charge read from the capacitor 25 in the reading process are the same, the pixel 4*a* including the capacitor 25 is determined as being acceptable.

FIG. 15 is a diagram illustrating an example of the relationship between the pass or fail of each of the elements and the value of the charge that is read in the inspection method according to the modification of Embodiment 2 of the present disclosure.

When the voltage variation reducing transistor 41 ($T_L$) is in the open circuit condition, since the data line 11 is set to the low level in the holding process, the charge held in the capacitor 25 leaks to the data line 11 through the selection transistors 26 and 27. For this reason, the amount of charge to be read is the value lower than the reference value. In addition, when the voltage variation reducing transistor 41 ($T_L$) is in the short circuit condition, charge is written in the capacitor 25 from the power line 19 through the voltage variation reducing transistor 41 and the selection transistor 26. For this reason, the amount of charge to be read is the value higher than the reference value ("higher than reference value" in FIG. 15). Note that the reference value, to be specific, corresponds to the amount of charge written in the capacitor 25 in the writing process.

As to the selection transistor 26 ($T_{S1}$), the selection transistor 27 ($T_{S2}$), the guard potential transistor 28 ($T_G$), the drive transistor 24 ($T_d$), and the capacitor 25 (C), they are equivalent to those in the modification of Embodiment 1. Note that, when each of the elements is neither in the open circuit condition nor in the short circuit condition, in other words, when each of the elements functions properly, the amount of charge to be read is the same as the reference value.

As described above, the inspection method according to the modification of Embodiment 2 of the present disclosure includes: the writing process for writing a charge in the capacitor 25; the reading process for reading the charge from the capacitor 25; and the holding process for holding the charge for a predetermined period from the end of the writing process to the start of the reading process. The provision of the period for holding the charge by the capacitor 25 makes it possible to cause the leakage of charge from the capacitor 25 or overcharge to the capacitor 25 in the case where the voltage variation reducing transistor 41 is faulty. With this configuration, it is possible to determine the pass or fail of the voltage variation reducing transistor 41.

As described above, with the inspection method according to the modification of Embodiment 2 of the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel.

[Embodiment 3]

In the display device 3 described in Embodiment 2, a flow-through current constantly flows through a path from the power line 19 through the guard potential transistor 18, the first connecting point, the voltage variation reducing transistor 31 to the anode electrode of the organic EL device 13, during a display operation. In addition, in the display device 4 described in the modification of Embodiment 2, the flow-through current constantly flows through a path from the power line 19 through the voltage variation reducing transistor 41, the first connecting point, the guard potential transistor 28 to the fixed potential line 29, during the display operation. The flow-through current increases the power consumption.

The display device according to this embodiment produces the advantageous effects equivalent to the advantageous effects produced by, and solves the problems posed by, the above-described display devices according to Embodiment 2. The following describes this embodiment according to the present disclosure with reference to the drawings.

FIG. 16 is a diagram illustrating a circuit configuration of a pixel and connections with circuits around the pixel included in a display device according to Embodiment 3 of the present disclosure. The display device 5 in this diagram includes: a pixel 5*a*; the data line drive circuit 8; the scanning line drive circuit 9; the data line 11; the scanning line 12; and the power lines 19 and 20. A single pixel 5*a* is shown in FIG. 16 for convenience; however, the pixel 5*a* is disposed at each of the intersections of the scanning lines 12 and the data lines 11 in a matrix to configure the display unit. In addition, the data line 11 is disposed for each column of the pixels and the scanning line 12 is disposed for each row of the pixel.

The pixel 5*a* includes: the organic EL device 13; the drive transistor 14; the capacitor 15; the selection transistors 16, 17, and 52; the guard potential transistor 18; and the voltage variation reducing transistor 51.

The display device 5 illustrated in FIG. 16 is different, in terms of configuration, from the display device 3 illustrated in FIG. 9 in that the selection transistor 52 is provided and in the connecting point of the voltage variation reducing transistor 51. In the following description, description will be omitted for the components identical to those in the display device 3, and the description will be made focusing on the differences.

The selection transistor 52 is an example of the fifth transistor, which has the gate electrode connected to the scanning line 12, one of the source electrode and the drain electrode connected to the other of the source electrode and the drain electrode of the selection transistor 17, and the other of the source electrode and the drain electrode connected to the data line 11. The selection transistor 52 switches between conduction and non-conduction, in response to a scanning signal from the scanning line 12, between the data line 11 and the pixel 5*a* in synchronization with the selection transistors 16 and 17. The selection transistor 52 is configured of the n-type thin film transistor (n-type TFT). In the description below, a connecting point of: the other of the source electrode and the drain electrode of the selection transistor 17; and the one of the source electrode and the drain electrode of the selection transistor 52, is referred to as the second connecting point.

The voltage variation reducing transistor 51 is an example of the fourth transistor which has: the gate electrode short-circuited with the drain electrode; the drain electrode connected to the other of the source electrode and the drain electrode of the selection transistor 17; and the source electrode connected to the anode electrode of the organic EL device 13. The voltage variation reducing transistor 51 is configured of the n-type thin film transistor (n-type TFT). With the connections described above, the voltage variation reducing transistor 51 is diode-connected and current flows from the drain electrode to the source electrode.

Accordingly, when the capacitor 15 holds a voltage, it is possible to cause the current for preventing the potential $V_{P1}$ of the first connecting point from changing, to flow through the path from the power line 19 through the guard potential transistor 18, the first connecting point, the selection transistor 17, the second connecting point, the voltage variation reducing transistor 51 to the anode electrode of the organic EL device 13. With this current path, the potential $V_{P2}$ of the second connecting point during the display operation is fixed to the potential of the anode electrode of the organic EL device 13. More specifically, since the potential difference between the source and the drain can be maintained to be constant, it is possible to prevent the flow-through current from flowing into the organic EL device 13 from the power line 19 through the guard potential transistor 18.

This operation and the operation of the guard potential transistor 18 make the source-drain voltage of the selection transistor 16 to be constant. Accordingly, it is possible to maintain the potential $V_{P1}$ of the first connecting point regardless of the amount of the voltage of the data line 11.

The following describes an inspection method for the display device 5 according to Embodiment 3 of the present disclosure.

Figure 17:
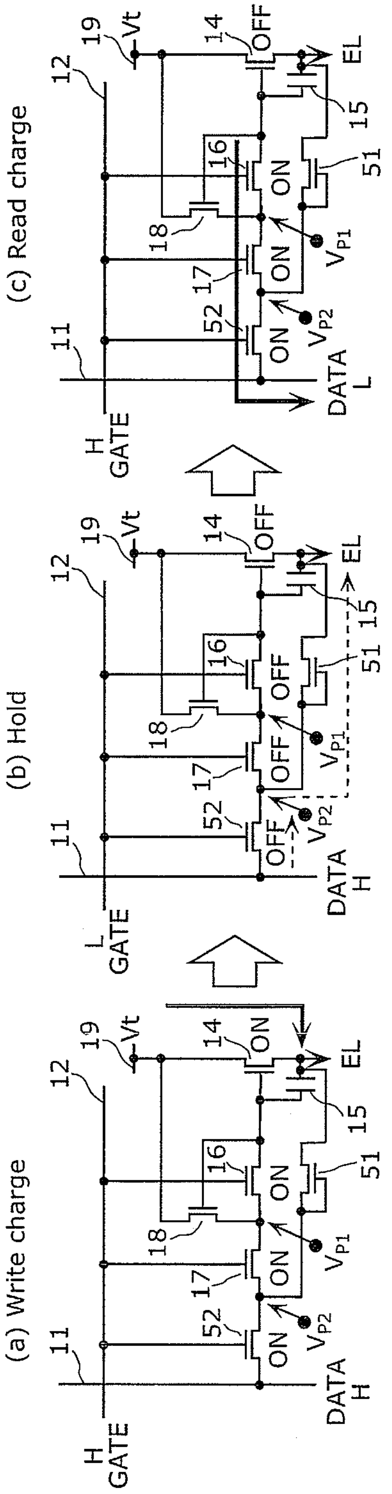
FIG. 17 is a circuit diagram illustrating an exemplary state when the inspection method according to Embodiment 3 of the present disclosure is executed.

FIG. 17 is a circuit diagram illustrating an exemplary state when the inspection method according to Embodiment 3 of the present disclosure is executed. In addition, the inspection method according to Embodiment 3 of the present disclosure is executed according to the timing chart illustrating in FIG. 10.

First, a writing process for writing a charge in the capacitor 15 is performed (S11). In this embodiment, a charge is written from the power line 19 to the capacitor 15. More specifically, the charge is sequentially written for each row from the power line 19 into the capacitor 15 included in each of the pixels 5*a*, as shown in FIG. 10. To be specific, the scanning line drive circuit 9 changes the scanning line 12 to a high level and the selection transistors 16, 17, and 52 are turned on as shown in FIG. 17(*a*). This brings the data line 11 and the capacitor connecting point into conduction. Note that, since the gate-source voltage is approximately 0, the guard potential transistor 18 does not operate, and thus in the off state.

At this time, since the data line 11 is in the high level due to the data line drive circuit 8, the drive transistor 14 is turned on as shown in FIG. 17(*a*). This brings the second electrode of the capacitor 15 and the power line 19 into conduction. Since the power line 19 is set to the predetermined potential Vt, charge corresponding to the potential difference between the potential of the data line 11 and the potential of the power line 19 is written in the capacitor 15.

Next, a holding process for holding the charge for a predetermined period from the end of the writing process to the start of a reading process is performed (S32). The term holding the charge (hold) here refers to standing by a predetermined period without driving the scanning line 12 and the data line 11. To be specific, the scanning line 12 is maintained at a low level, so that the selection transistors 16, 17, and 52 are turned off to cause the capacitor 15 to hold the charge. Note that, the predetermined period is equivalent to the predetermined period described in Embodiments 1 and 2.

At this time, in the case where each of the elements function properly, in other words, in the case where they are not faulty, current can flow through the voltage variation reducing transistor 51 so as to maintain the potential $V_{P1}$ of the first connecting point. When the potential of the data line 11 is high as shown in FIG. 17(*b*), a leakage current is caused to flow from the data line 11 through the voltage variation reducing transistor 51, thereby preventing writing of a charge into the capacitor 15.

In addition, when the voltage of the data line 11 is low, it is possible to cause the current for maintaining the potential $V_{P1}$ of the first connecting point to flow from the power line 19 to the data line 11 and the organic EL device 13. With this configuration, it is possible to prevent the leakage of charge from the capacitor 15 in the same manner as in Embodiment 2.

Note that, in this embodiment, the data line 11 is maintained at a high level in the holding process as shown in FIG. 10. At this time, when the guard potential transistor 18 is in the open circuit condition, the charge held in the capacitor 15 leaks to the organic EL device 13 through the selection transistor 16 and the voltage variation reducing transistor 51.

In addition, when the voltage variation reducing transistor 51 is in the open circuit condition, there is no path for the leakage current from the data line 11 to flow. For this reason, a charge is written in the capacitor 15 from the data line 11 (overcharge).

Next, a reading process for reading the written charge from the capacitor 15 is performed (S13). In this embodiment, the charge written in the capacitor 15 is read from the data line 11. More specifically, the charge is sequentially read for each row from the capacitor 15 included in each of the pixels 5*a* via the data line 11, as shown in FIG. 10.

First, the scanning line drive circuit 9 changes the scanning line 12 to the high level and the selection transistors 16, 17, and 52 are turned on as shown in FIG. 17(*c*). This brings the data line 11 and the capacitor connecting point into conduction. The data line 11 is set to the low level, and thus the charge is read from the capacitor 15 via the data line 11.

Next, determination of the charge that is read is carried out (S14). More specifically, the amount of charge written in the capacitor 15 in the writing process and the amount of charge read from the capacitor 15 in the reading process are compared. When the amount of charge written in the capacitor 15 in the writing process and the amount of charge read from the capacitor 15 in the reading process are different, the pixel 5*a* including the capacitor 15 is determined as being unacceptable. In addition, when the amount of charge written in the capacitor 15 in the writing process and the amount of charge read from the capacitor 15 in the reading process are the same, the pixel 5*a* including the capacitor 15 is determined as being acceptable.

FIG. 18 is a diagram illustrating an example of the relationship between the pass or fail of each of the elements and the value of the charge that is read in the inspection method according to Embodiment 3 of the present disclosure.

The drive transistor 14 is not turned on in the writing process when the selection transistor 52 ($T_{s0}$) is in the open circuit condition, and thus the charge cannot be written in the capacitor 15. Accordingly, the amount of charge to be read is approximately 0. In addition, the amount of charge to be read is the value lower than the reference value when the selection transistor 52 ($T_{s0}$) is in the short circuit condition.

The drive transistor 14 is not turned on in the writing process when the selection transistor 17 ($T_{s2}$) is in the open circuit condition, and thus the charge cannot be written in the capacitor 15. Accordingly, the amount of charge to be read is approximately 0. When the selection transistor 17 ($T_{s2}$) is in the short circuit condition, the circuit of the pixel 5*a* is the circuit equivalent to the pixel 3*a* according to Embodiment 2. More specifically, although the power consumption increases due to the flow-through current flowing, there is no problem as the operation of the circuit itself.

When the voltage variation reducing transistor 51 ($T_L$) is in the open circuit condition, since the data line 11 is set to the high level in the holding process, charge is written in the capacitor 15 from the data line 11. For this reason, the amount of charge to be read is the value higher than the reference value. In addition, when the voltage variation reducing transistor 51 ($T_L$) is in the short circuit condition, since both of the electrodes of the capacitor 15 are short-circuited in the writing process, charge cannot be written in the capacitor 15. Accordingly, the amount of charge to be read is approximately 0.

As to the selection transistor 16 ($T_{s1}$), the guard potential transistor 18 ($T_G$), the drive transistor 14 ($T_d$), and the capacitor 15 (C), they are equivalent to those in Embodiment 2. Note that, when each of the elements is neither in the open circuit condition nor in the short circuit condition, in other words, when each of the elements functions properly, the amount of charge to be read is the same as the reference value.

As described above, the inspection method according to Embodiment 3 of the present disclosure includes: the writing process for writing a charge in the capacitor 15; the reading process for reading the charge from the capacitor 15; and the holding process for holding the charge for the predetermined period from the end of the writing process to the start of the reading process. The provision of the period for holding the charge by the capacitor 15 makes it possible to cause the leakage of charge from the capacitor 15 or the overcharge to the capacitor 15 in the case where any of the elements are faulty. With this configuration, it is possible to determine the pass or fail of each of the elements.

As described above, with the inspection method according to Embodiment 3 of the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel. Thus, according to Embodiment 3 of the present disclosure, since new transistors (the guard potential transistor, the selection transistor, and the voltage variation reducing transistor) are provided in the pixel in order to prevent generation of an off-leakage current and a flow-through current, it is possible to determine the pass or fail of these new transistors as well.

Note that, in Embodiment 3 of the present disclosure, each of the transistors included in the pixel is explained as the n-type transistor. Contrary to this, each of the transistors included in the pixel may be the p-type transistor. FIG. 19 is a diagram illustrating an example of a circuit configuration of a pixel and connections with circuits around the pixel included in a display device according to a modification of Embodiment 3 of the present disclosure.

A display device 6 in FIG. 19 includes: a pixel 6*a;* the data line drive circuit 8; the scanning line drive circuit 9; the data line 11; the scanning line 12; the power lines 19 and 20; and the fixed potential line 29. A single pixel 6*a* is shown in FIG. 12 for convenience; however, the pixel 6*a* is disposed at each of the intersections of the scanning lines 12 and the data lines 11 in a matrix to configure the display unit. In addition, the data line 11 is disposed for each column of the pixels and the scanning line is disposed for each row of the pixel. The pixel 6*a* includes: the organic EL device 13; the drive transistor 24; the capacitor 25; the selection transistors 26, 27, and 62; the guard potential transistor 28; and a voltage variation reducing transistor 61. The display device 6 illustrated in FIG. 19 is different, in terms of configuration, from the display device 4 illustrated in FIG. 13 in that the selection transistor 62 is provided and in the connecting point of the voltage variation reducing transistor 61. In the following description, description will be omitted for the components identical to those in the display device 4, and the description will be made focusing on the differences.

The selection transistor 62 is an example of the fifth transistor, which has the gate electrode connected to the scanning line 12, one of the source electrode and the drain electrode connected to the other of the source electrode and the drain electrode of the selection transistor 27, and the other of the source electrode and the drain electrode connected to the data line 11. The selection transistor 62 switches between conduction and non-conduction, in response to a scanning signal from the scanning line 12, between the data line 11 and the pixel 6*a* in synchronization with the selection transistors 26 and 27. The selection transistor 62 is configured of the p-type thin film transistor (p-type TFT). In the description below, a connecting point of: the other of the source electrode and the drain electrode of the selection transistor 17; and the one of the source electrode and the drain electrode of the selection transistor 62, is referred to as the second connecting point.

The voltage variation reducing transistor 61 is an example of the fourth transistor which has: the gate electrode short-circuited with the drain electrode; the drain electrode connected to the other of the source electrode and the drain electrode of the selection transistor 27; and the source electrode connected to the power line 19. The voltage variation reducing transistor 61 is configured of the p-type thin film transistor (p-type TFT). With the connections described above, the voltage variation reducing transistor 61 is diode-connected and current flows from the source electrode to the drain electrode.

Accordingly, when the capacitor 25 holds the voltage, it is possible to cause the current for preventing the potential $V_{P1}$ of the first connecting point from changing, to flow through the path from the power line 19 through the voltage variation reducing transistor 61, the second connecting point, the selection transistor 27, the first connecting point, the guard potential transistor 28, to the fixed potential line 29. With this current path, the potential $V_{P2}$ of the second connecting point during the display operation is fixed to the potential of the power line 19. This operation and the operation of the guard potential transistor 28 make the source-drain voltage of the selection transistor 27 to be constant. Accordingly, it is possible to maintain the potential $V_{P1}$ of the first connecting point to be constant regardless of the amount of the voltage of the data line 11.

Figure 20:
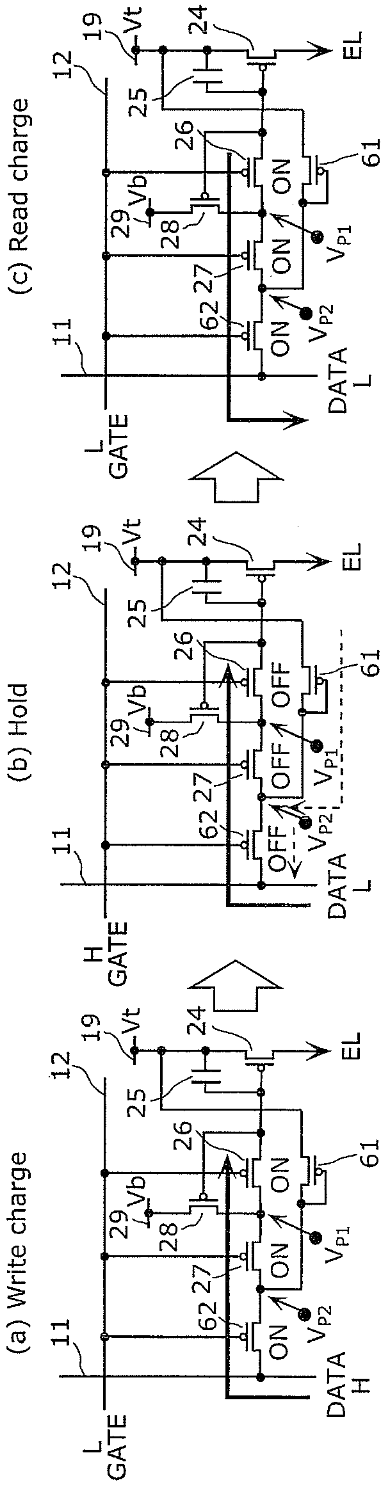
FIG. 20 is a circuit diagram illustrating an exemplary state when the inspection method according to the modification of Embodiment 3 of the present disclosure is executed.
Figure 23:
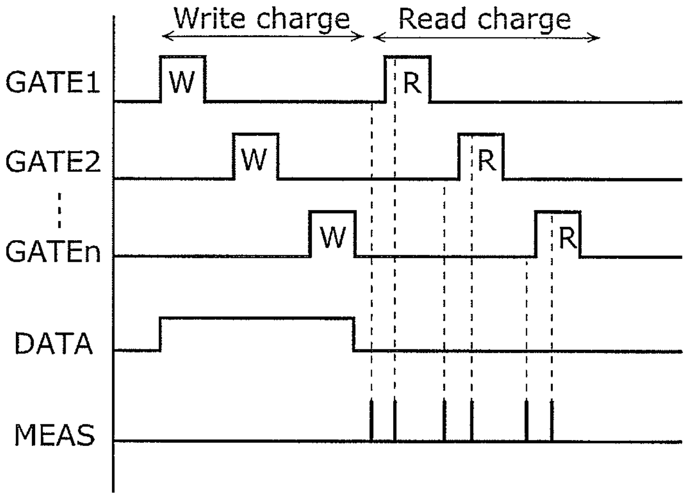
FIG. 23 is a timing chart illustrating a conventional inspection method.

The following describes an inspection method for the display device 6 according to a modification of Embodiment 3 of the present disclosure. FIG. 20 is a circuit diagram illustrating an exemplary state when the inspection method according to the modification of Embodiment 3 of the present disclosure is executed. In addition, the inspection method according to Embodiment 3 of the present disclosure is executed according to the timing chart illustrating in FIG. 6.

First, a writing process for writing a charge in the capacitor 25 is performed (S21). In the modification of this embodiment, the charge is written from the power line 11 into the capacitor 25. More specifically, the charge is sequentially written for each row from the data line 11 into the capacitor 25 included in each of the pixels 6*a*, as shown in FIG. 6.

To be specific, the scanning line drive circuit 9 changes the scanning line 12 to a low level and the selection transistors 26, 27, and 62 are turned on as shown in FIG. 20(*a*). This brings the data line 11 and the capacitor connecting point into conduction. Since the power line 19 is set to the predetermined potential Vt, charge corresponding to the potential difference between the potential of the data line 11 and the potential of the power line 19 is written in the capacitor 25.

Next, a holding process for holding the charge for a predetermined period from the end of the writing process to the start of a reading process is performed (S22). The term holding the charge (hold) here refers to standing by a predetermined period without driving the scanning line 12 and the data line 11. To be specific, the scanning line 12 is maintained at a high level, so that the selection transistors 26, 27, and 62 are turned off to cause the capacitor 25 to hold the charge. Note that, the predetermined period is equivalent to the predetermined period described in Embodiments 1 and 2.

At this time, in the case where each of the elements functions properly, in other words, in the case where they are not faulty, current can flow through the voltage variation reducing transistor 61 so as to maintain the potential $V_{P1}$ of the first connecting point. For example, when the voltage of the data line 11 is low, it is possible to cause current from the power line 19 to flow into the data line 11 in order to maintain the potential $V_{P1}$ of the first connecting point, as shown in FIG. 20(*b*). In addition, when the voltage of the data line 11 is high, it is possible to cause a leakage current from the data line 11 to flow into the fixed potential line 29 through the guard potential transistor 28. With this configuration, it is possible to prevent the leakage of charge from the capacitor 25 in the same manner as in the modification of Embodiment 2.

Note that, in the modification of this embodiment, the data line 11 is maintained at a low level in the holding process as shown in FIG. 6. At this time, when the guard potential transistor 28 is in the open circuit condition, the charge held in the capacitor 25 leaks to the data line 11. In addition, when the guard potential transistor 28 is in the short circuit condition, the charge held in the capacitor 25 leaks to the fixed potential line 29 through the guard potential transistor 28.

In addition, when the voltage variation reducing transistor 61 is in the open circuit condition, since the current for maintaining the potential $V_{P1}$ of the first connecting point does not flow from the power line 19, the charge held in the capacitor 25 leaks to the line 11 through the selection transistors 26, 27, and 62. In addition, when the voltage variation reducing transistor 61 is in the short circuit condition, charge is written in the capacitor 25 from the power line 19 (overcharge). Next, a reading process for reading the written charge from the capacitor 25 is performed (S23). In this embodiment, the charge written in the capacitor 25 is read from the data line 11. More specifically, the charge is sequentially read for each row from the capacitor 25 included in each of the pixels 6*a* via the data line 11, as shown in FIG. 6.

First, the scanning line drive circuit 9 changes the scanning line 12 to the low level and the selection transistors 26 and 27 are turned on as shown in FIG. 20(*c*). This brings the data line 11 and the capacitor connecting point into conduction. The data line 11 is set to the low level, and thus the charge is read from the capacitor 25 via the data line 11.

Next, determination of the charge that is read is carried out (S24). More specifically, the amount of charge written in the capacitor 25 in the writing process and the amount of charge read from the capacitor 25 in the reading process are compared. When the amount of charge written in the capacitor 25 in the writing process and the amount of charge read from the capacitor 25 in the reading process are different, the pixel 6*a* including the capacitor 25 is determined as being unacceptable. In addition, when the amount of charge written in the capacitor 25 in the writing process and the amount of charge read from the capacitor 25 in the reading process are the same, the pixel 6*a* including the capacitor 25 is determined as being acceptable.

FIG. 21 is a diagram illustrating an example of the relationship between the pass or fail of each of the elements and the value of the charge that is read in the inspection method according to the modification of Embodiment 3 of the present disclosure.

The drive transistor 24 is not turned on in the writing process when the selection transistor 62 ($T_{s0}$) is in the open circuit condition, and thus the charge cannot be written in the capacitor 25. Accordingly, the amount of charge to be read is approximately 0. In addition, since the data line 11 is at a low level when the selection transistor 62 ($T_{S0}$) is in the short circuit condition, the charge written in the capacitor 25 leaks to the data line 11. For this reason, the amount of charge to be read is the value lower than the reference value.

The drive transistor 24 is not turned on in the writing process when the selection transistor 27 ($T_{s2}$) is in the open circuit condition, and thus the charge cannot be written in the capacitor 25. Accordingly, the amount of charge to be read is approximately 0. When the selection transistor 27 ($T_{s2}$) is in the short circuit condition, the circuit of the pixel 6*a* is the circuit equivalent to the pixel 4*a* according to the modification of Embodiment 2. More specifically, although the power consumption increases due to the flow-through current flowing, there is no problem as the operation of the circuit itself.

When the voltage variation reducing transistor 61 ($T_L$) is in the open circuit condition, since the data line 11 is set to the low level in the holding process, the charge held in the capacitor 25 leaks to the data line 11 through the selection transistors 26, 27, and 62. For this reason, the amount of charge to be read is the value lower than the reference value. In addition, when the voltage variation reducing transistor 61 ($T_L$) is in the short circuit condition, charge is written in the capacitor 25 from the power line 19 via the voltage variation reducing transistor 61. For this reason, the amount of charge to be read is the value higher than the reference value.

As to the selection transistor 26 ($T_{s1}$) the guard potential transistor 28 ($T_G$), the drive transistor 24 ($T_d$), and the capacitor 25 (C), they are equivalent to those in the modification of Embodiment 2. Note that, when each of the elements is neither in the open circuit condition nor in the short circuit condition, in other words, when each of the elements functions properly, the amount of charge to be read is the same as the reference value.

As described above, the inspection method according to the modification of Embodiment 3 of the present disclosure includes: the writing process for writing a charge in the capacitor 25; the reading process for reading the charge from the capacitor 25; and the holding process for holding the charge for a predetermined period from the end of the writing process to the start of the reading process. The provision of the period for holding the charge by the capacitor 25 makes it possible to cause the leakage of charge from the capacitor 25 or the overcharge to the capacitor 25 in the case where any of the elements are faulty. With this configuration, it is possible to determine the pass or fail of each of the elements.

As described above, with the inspection method according to the modification of Embodiment 3 of the present disclosure, it is possible to correctly determine the pass or fail of a pixel, in an active-matrix substrate including the pixel in which a time-dependent change in a voltage held therein is not caused by an off-leakage current, even with the progress in miniaturization of the pixel.

The inspection method according to the present disclosure has been described based on the embodiments; however, the present disclosure is not limited to these embodiments. Other forms in which various modifications apparent to those skilled in the art are applied to the embodiment, or forms structured by combining elements of different embodiments are included within the scope of the present disclosure, unless such changes and modifications depart from the scope of the present disclosure.

For example, the pixel (pixel circuit) included in the display device according to the present disclosure is not limited to the pixels cited in Embodiments 1 to 3 and the modifications thereof. A display device including, in addition to the above-described pixels, for example, a pixel including a switching transistor between the power line 19 and the power line 20 for controlling a light emission period is also included in the present disclosure.

Note that, although the open circuit condition and the short circuit condition have been described as is faults in each of the embodiments, the short circuit may include, for example, the case where each of the elements serves merely as a resistance, in addition to the case of a complete short circuit condition.

In addition, all of the numerical characters described above are used as exemplification in order to describe the present disclosure specifically, and the present disclosure is not limited to the numerical characters used as exemplification. In addition, a logic level represented by high/low, and the switching state represented by on/off are exemplifications for describing the present disclosure specifically. It is also possible to obtain an equivalent result by a different combination of the exemplified logic level or switching state. Furthermore, the n-type, the P-type, and so on of the transistor and the like are exemplifications for describing the present disclosure specifically. It is also possible to obtain an equivalent result by inverting them.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

One or more exemplary embodiments of the present disclosure are applicable to, for example, an inspection method for an active organic EL flat panel display whose luminance is changed by controlling the intensity of light emission of a pixel using a pixel signal current, for example.

The invention claimed is:

1. An inspection method for an active-matrix substrate including a plurality of scanning lines, a plurality of data lines, a plurality of pixels each disposed at an intersection of one of the scanning lines and one of the data lines, and a power line for supplying current to the pixels, wherein each of the pixels includes:

a light-emitting device which emits light according to a flow of a drive current corresponding to a data voltage supplied through one of the data lines;

a drive transistor which is connected between the power line and the light-emitting device and which converts the data voltage into the drive current, according to a voltage applied to a gate electrode of the drive transistor;

a capacitor which has one electrode connected to the gate electrode of the drive transistor and which holds a voltage corresponding to the data voltage;

a first transistor having (i) a gate electrode connected to one of the scanning lines and (ii) one of a source electrode and a drain electrode connected to the gate electrode of the drive transistor;

a second transistor having (i) a gate electrode connected to the one of the scanning lines, (ii) one of a source electrode and a drain electrode connected to the other of the source electrode and the drain electrode of the first transistor, and (iii) the other of the source electrode and the drain electrode connected to the one of the data lines;

a third transistor having (i) a gate electrode connected to the one of the source electrode and the drain electrode of the first transistor, (ii) a source electrode connected to the other of the source electrode and the drain electrode of the first transistor, and (iii) a drain electrode connected to a first potential line; and a fourth transistor having a gate electrode connected to a drain electrode that is connected to the other of the source electrode and the drain electrode of the first transistor, and a source electrode connected to a second potential line, the inspection method comprising:

writing a charge in the capacitor;

reading the written charge from the capacitor; and holding the charge for a predetermined period from an end of the writing to a start of the reading, wherein in the holding, the charge is held for a period equal to or longer than a period based on a time constant defined by an off resistance of the first transistor, an off resistance of the second transistor, and the capacitor.

2. The inspection method according to claim 1, wherein in the holding, the charge is held for a period equal to or longer than one millisecond.

3. The inspection method according to claim 1, further comprising:

determining that the one of the pixels having the capacitor is unacceptable when an amount of charge written in the capacitor in the writing and an amount of charge read from the capacitor in the reading are different from each another.

4. The inspection method according to claim 1, wherein the drive transistor, the first transistor, the second transistor, and the third transistor are n-type transistors, the first potential line is the power line whose potential with respect to a reference potential is set to be equal to or higher than a highest voltage held by the capacitor, in the writing, the charge is written in the capacitor from the power line, in the reading, the charge written in the capacitor from the data line is read, and in the holding, the data line is maintained at a low level for the predetermined period.

5. The inspection method according to claim 1, wherein the drive transistor, the first transistor, the second transistor, and the third transistor are p-type transistors, the first potential line is the scanning line, in the writing, the charge is written in the capacitor from the data line, in the reading, the charge written in the capacitor from the data line is read, and in the holding, the data line is maintained at a low level for the predetermined period.

6. The inspection method according to claim 1, wherein the fourth transistor is an n-type transistor, the second potential line is a second power line whose potential with respect to a reference potential is set to be equal to or lower than a lowest voltage held by the capacitor, in the writing, the charge is written in the capacitor from the power line, in the reading, the charge written in the capacitor from the data line is read, and in the holding, the data line is maintained at a high level for the predetermined period.

7. The inspection method according to claim 1, wherein the second potential line is connected to an anode electrode of the light-emitting device.

8. The inspection method according to claim 1, wherein the fourth transistor is a p-type transistor, the second potential line is the power line whose potential with respect to a reference potential is set to be equal to or higher than a highest voltage held by the capacitor, in the writing, the charge is written in the capacitor from the data line, in the reading, the charge written in the capacitor from the data line is read, and in the holding, the data line is maintained at a low level for the predetermined period.

9. An inspection method for an active-matrix substrate including a plurality of scanning lines, a plurality of data lines, a plurality of pixels each disposed at an intersection of one of the scanning lines and one of the data lines, and a power line for supplying current to the pixels, wherein each of the pixels includes:

a light-emitting device which emits light according to a flow of a drive current corresponding to a data voltage;

a drive transistor which is connected between the power line and the light-emitting device and which converts the data voltage into the drive current, according to a voltage applied to a gate electrode;

a capacitor which has one electrode connected to the gate electrode of the drive transistor and which holds a voltage corresponding to the data voltage;

a first transistor having (i) a gate electrode connected to one of the scanning lines and (ii) one of a source electrode and a drain electrode connected to the gate electrode of the drive transistor;

a second transistor having (i) a gate electrode connected to the one of the scanning lines, (ii) one of a source electrode and a drain electrode connected to the other of the source electrode and the drain electrode of the first transistor;

a fifth transistor having (i) a gate electrode connected to the one of the scanning lines, (ii) one of a source electrode and a drain electrode connected to the other of the source electrode and the drain electrode of the second transistor, and (iii) the other of the source electrode and the drain electrode is connected to the one of the data lines;

a third transistor having (i) a gate electrode connected to the one of the source electrode and the drain electrode of the first transistor, (ii) a source electrode connected to the other of the source electrode and the drain electrode of the first transistor, and (ii) a drain electrode connected to a first potential line; and a fourth transistor having a gate electrode connected to a drain electrode that is connected to the other of the source electrode and the drain electrode of the second transistor, and a source electrode connected to a second potential line, said inspection method comprising:

writing a charge in the capacitor;

reading the written charge from the capacitor; and holding the charge for a predetermined period from an end of the writing to a start of the reading wherein in the holding, the charge is held for a period equal to or longer than a period based on a time constant defined by an off resistance of the first transistor, an off resistance of the second transistor, and the capacitor.

10. The inspection method according to claim 9, wherein in the holding, the charge is held for a period equal to or longer than a period based on a time constant defined by an off resistance of the first transistor, an off resistance of the second transistor, and the capacitor.

11. The inspection method according to claim 9, wherein in the holding, the charge is held for a period equal to or longer than one millisecond.

12. The inspection method according to claim 9, further comprising:

determining that the one of the pixels having the capacitor is unacceptable when an amount of charge written in the capacitor in the writing and an amount of charge read from the capacitor in the reading are different from each another.

13. The inspection method according to claim 9, wherein the drive transistor, the first transistor, the second transistor, the third transistor, the fourth transistor, and the fifth transistor are n-type transistors, the first potential line is the power line whose potential with respect to a reference potential is set to be equal to or higher than a highest voltage held by the capacitor, the second potential line is a second power line whose potential with respect to the reference potential is set to be equal to or lower than a lowest voltage held by the capacitor, in the writing, the charge is written in the capacitor from the power line, in the reading, the charge written in the capacitor from the data line is read, and in the holding, the data line is maintained at a high level for the predetermined period.

14. The inspection method according to claim 9, wherein the drive transistor, the first transistor, the second transistor, the third transistor, the fourth transistor, and the fifth transistor are p-type transistors, the first potential line is the scanning line, the second potential line is the power line whose potential with respect to a reference potential is set to be equal to or higher than a highest voltage held by the capacitor, in the writing, the charge is written in the capacitor from the data line, in the reading, the charge written in the capacitor from the data line is read, and in the holding, the data line is maintained at a low level for the predetermined period.

15. An inspection method for an active-matrix substrate including a plurality of scanning lines, a plurality of data lines, a plurality of pixels each disposed at an intersection of one of the scanning lines and one of the data lines, and a power line for supplying current to the pixels, wherein each of the pixels includes:

a light-emitting device which emits light according to a flow of a drive current corresponding to a data voltage supplied through one of the data lines;

a drive transistor which is connected between the power line and the light-emitting device and which converts the data voltage into the drive current, according to a voltage applied to a gate electrode of the drive transistor;

a capacitor which has one electrode connected to the gate electrode of the drive transistor and which holds a voltage corresponding to the data voltage;

a first transistor having (i) a gate electrode connected to one of the scanning lines and (ii) one of a source electrode and a drain electrode connected to the gate electrode of the drive transistor;

a second transistor having (i) a gate electrode connected to the one of the scanning lines, (ii) one of a source electrode and a drain electrode connected directly to the other of the source electrode and the drain electrode of the first transistor, and (iii) the other of the source electrode and the drain electrode connected to the one of the data lines;

a third transistor having (i) a gate electrode connected to the one of the source electrode and the drain electrode of the first transistor, (ii) a source electrode connected to the other of the source electrode and the drain electrode of the first transistor, and (iii) a drain electrode connected to a first potential line; and a fourth transistor having a gate electrode connected to a drain electrode that is connected to the other of the source electrode and the drain electrode of the first transistor, and a source electrode connected to a second potential line, the inspection method comprising:

writing a charge in the capacitor;

reading the written charge from the capacitor; and holding the charge for a predetermined period from an end of the writing to a start of the reading wherein in the holding, the charge is held for a period equal to or longer than a period based on a time constant defined by an off resistance of the first transistor, an off resistance of the second transistor, and the capacitor.

16. An inspection method for an active-matrix substrate including a plurality of scanning lines, a plurality of data lines, a plurality of pixels each disposed at an intersection of one of the scanning lines and one of the data lines, and a power line for supplying current to the pixels, wherein each of the pixels includes:

a light-emitting device which emits light according to a flow of a drive current corresponding to a data voltage supplied through one of the data lines;

a drive transistor which is connected between the power line and the light-emitting device and which converts the data voltage into the drive current, according to a voltage applied to a gate electrode of the drive transistor;

a capacitor which has one electrode connected to the gate electrode of the drive transistor and which holds a voltage corresponding to the data voltage;

a first transistor having (i) a gate electrode connected to one of the scanning lines and (ii) one of a source electrode and a drain electrode connected to the gate electrode of the drive transistor;

a second transistor having (i) a gate electrode connected to the one of the scanning lines, (ii) one of a source electrode and a drain electrode connected to the other of the source electrode and the drain electrode of the first transistor directly, and (iii) the other of the source electrode and the drain electrode connected to the one of the data lines; and a third transistor having (i) a gate electrode connected to the one of the source electrode and the drain electrode of the first transistor, (ii) a source electrode connected to the other of the source electrode and the drain electrode of the first transistor, and (iii) a drain electrode connected to a first potential line, the inspection method comprising:

writing a charge in the capacitor;

reading the written charge from the capacitor; and holding the charge for a predetermined period from an end of the writing to a start of the reading, wherein in the holding, the charge is held for a period equal to or longer than a period based on a time constant defined by an off resistance of the first transistor, an off resistance of the second transistor, and the capacitor.

* * * * *